US011102403B2

(12) United States Patent
Kawasaki

(10) Patent No.: US 11,102,403 B2
(45) Date of Patent: Aug. 24, 2021

(54) IMAGE DEVICE, INFORMATION PROCESSING APPARATUS, INFORMATION PROCESSING METHOD, SYSTEM, AND STORAGE MEDIUM

(71) Applicant: Gaku Kawasaki, Kanagawa (JP)

(72) Inventor: Gaku Kawasaki, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 16/659,955

(22) Filed: Oct. 22, 2019

(65) Prior Publication Data
US 2020/0128179 A1 Apr. 23, 2020

(30) Foreign Application Priority Data

Oct. 22, 2018 (JP) .............................. JP2018-198650
Oct. 16, 2019 (JP) .............................. JP2019-189440

(51) Int. Cl.
*H04N 5/232* (2006.01)
*H04N 5/217* (2011.01)

(52) U.S. Cl.
CPC ......... *H04N 5/23238* (2013.01); *H04N 5/217* (2013.01); *H04N 5/23245* (2013.01); *H04N 5/23293* (2013.01)

(58) Field of Classification Search
CPC ............... H04N 5/23238; H04N 5/217; H04N 5/23245; H04N 5/23293; H04N 5/2628; H04N 5/23267; H04N 5/23258; H04N 5/23229
See application file for complete search history.

(56) References Cited

U.S. PATENT DOCUMENTS

| 2014/0104446 A1 | 4/2014 | Kawasaki |
| 2015/0062363 A1 | 3/2015 | Takenaka et al. |
| 2015/0130963 A1 | 5/2015 | Tanaka et al. |
| 2015/0181125 A1* | 6/2015 | Noguchi ............. G02B 27/646 348/208.11 |
| 2016/0205308 A1 | 7/2016 | Maeda |

FOREIGN PATENT DOCUMENTS

| JP | 2013-214947 | 10/2013 |
| JP | 2015-139029 | 7/2015 |
| WO | 2018168902 A1 | 9/2018 |

OTHER PUBLICATIONS

Extended European Search Report dated Feb. 25, 2020, issued in corresponding European Patent Application No. 19204245.5, 10 pages.

* cited by examiner

Primary Examiner — Joseph W Becker
(74) Attorney, Agent, or Firm — Xsensus LLP

(57) ABSTRACT

An imaging device includes an imaging optical system configured to capture a plurality of images of an object; a sensor configured to detect a tilt of the imaging device with respect to a reference direction; and processing circuitry. The processing circuitry is configured to set a fixed amount of correction to be commonly applied to the plurality of images, based on the detected tilt; and correct the tilt of each of the plurality of images using the fixed amount of correction.

18 Claims, 14 Drawing Sheets

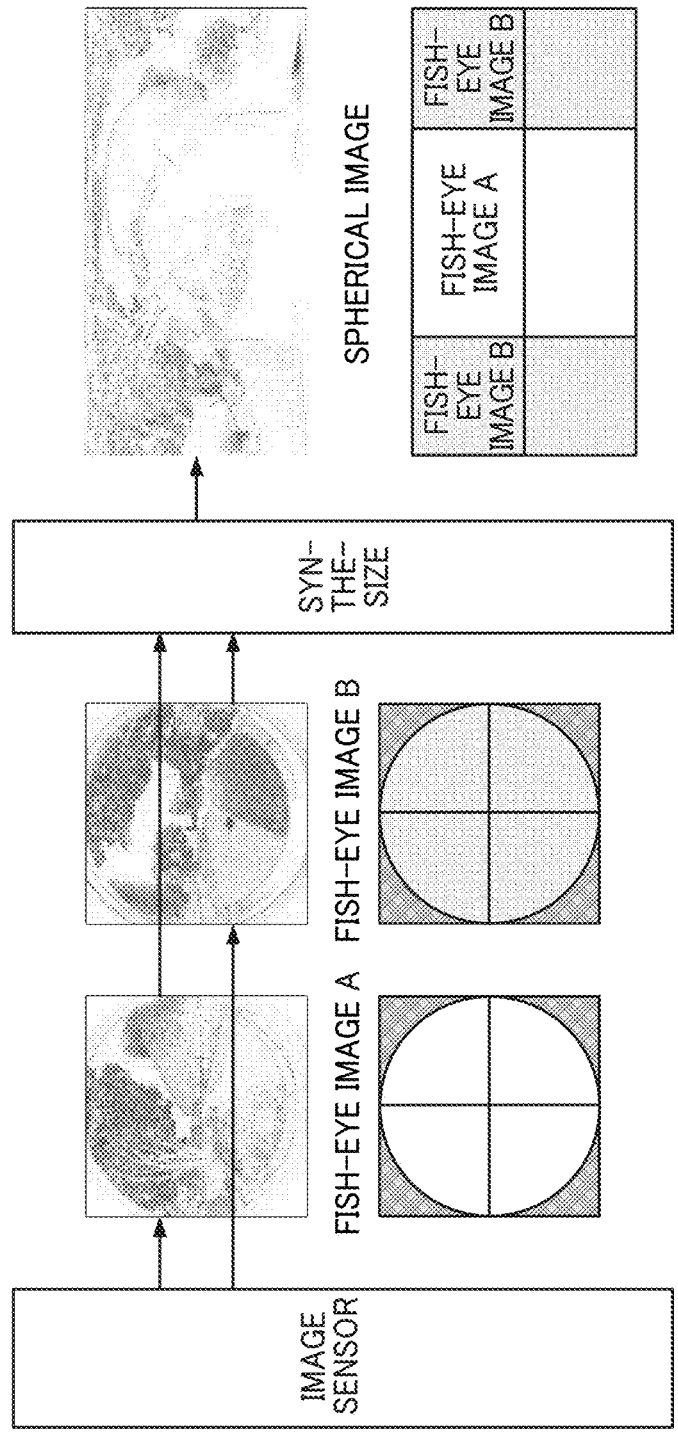

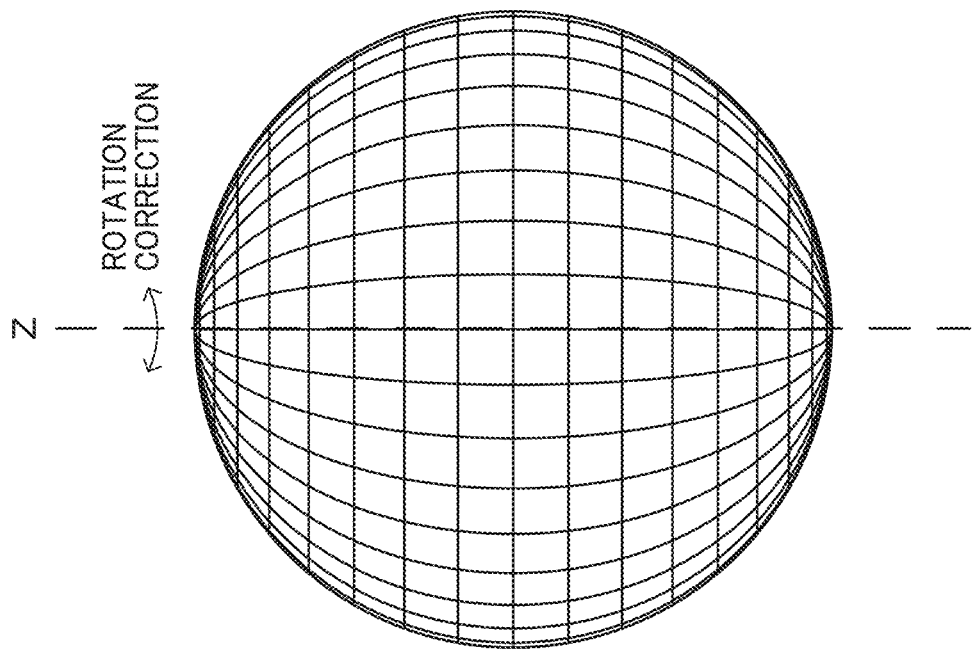
FIG. 5
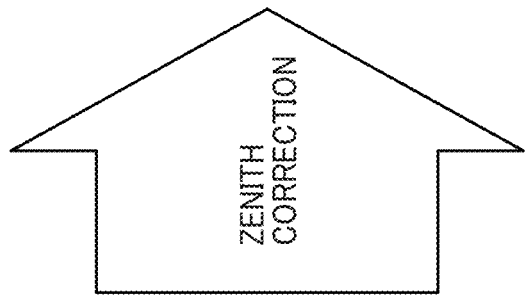
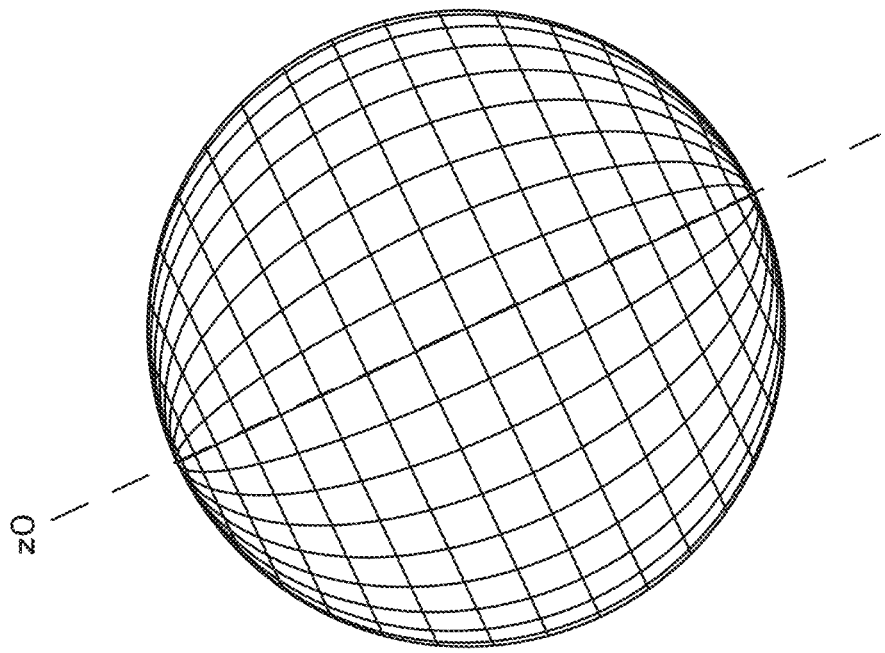

IMAGE DEVICE, INFORMATION PROCESSING APPARATUS, INFORMATION PROCESSING METHOD, SYSTEM, AND STORAGE MEDIUM

CROSS-REFERENCE TO RELATED APPLICATION

This patent application is based on and claims priority pursuant to 35 U.S.C. § 119(a) to Japanese Patent Application No. 2018-198650, filed on Oct. 22, 2018 and Japanese Patent Application No. 2019-189440, filed on Oct. 16, 2019, in the Japan Patent Office, the entire disclosure of which are hereby incorporated by reference herein.

BACKGROUND

Technical Field

The present disclosure relates to an imaging device, an information processing apparatus, an information processing method, a system, and a storage medium.

Related Art

Conventionally, there is known the function of correcting the zenith to correct the tilt of the captured spherical image by using the tilt relative to the vertical direction, obtained based on the output from the acceleration sensor, so that the zenith direction of the image is aligned with the vertical direction.

In the conventional device, however, there are cases in which the viewer might feel uncomfortable when continuously shooting with the imaging device (viewpoint) fixed at a particular position, for example, in the interval shooting. In other words, since the tilt is calculated from the acceleration sensor for each image, which is used to perform the correction, the amount of correcting the tilt might slightly change due to the noise of the sensor, even with the imaging device fixed. For this reason, the tilt might slightly change and the viewers feel uncomfortable when viewing the corrected continuous captured images.

SUMMARY

In one aspect of this disclosure, there is provided an improved imaging device includes an imaging optical system configured to capture a plurality of images of an object; a sensor configured to detect a tilt of the imaging device with respect to a reference direction; and processing circuitry. The processing circuitry is configured to set a fixed amount of correction to be commonly applied to the plurality of images, based on the detected tilt; and correct the tilt of each of the plurality of images using the fixed amount of correction.

In another aspect of this disclosure, there is provided an improved system including the above-described imaging device; and an information processing apparatus communicably connected with the imaging device. The information processing apparatus includes another circuitry configured to obtain the plurality of images of the object, each having the tilt corrected, from the imaging device, in response to a request for viewing of the plurality of images; and control a display to display the obtained plurality of images.

In still another aspect of this disclosure, there is provided an improved information processing apparatus including processing circuitry configured to acquire a plurality of images of an object, each captured by an imaging device, and tilt data indicating a tilt of the imaging device with respect to a reference direction; set a fixed amount of correction to be commonly applied to the plurality of images, based on the detected tilt; correct the tilt of each of the plurality of images using the fixed amount of correction; and control a display to display the plurality of images of the object, each having the tilt corrected, in response to a request for viewing of the plurality of images.

In yet still another aspect of this disclosure, there is provided an improved system including the above-described information processing apparatus, and an imaging device communicably connected with the information processing apparatus. The imaging device includes an imaging optical system configured to capture a plurality of images of an object; a sensor configured to detect a tilt of the imaging device with respect to a reference direction; and another processing circuitry configured to transmit the plurality of images of the object, and tilt data indicating the tilt of the imaging device for each of the plurality of images, to the information processing apparatus.

In further aspect of this disclosure, there is provided an improved system including an imaging device and an information processing apparatus. The imaging device includes: an imaging optical system configured to capture a plurality of images of an object; and a sensor configured to detect a tilt of the imaging device with respect to a reference direction. The information processing apparatus includes: processing circuitry configured to acquire the plurality of images, and tilt data indicating the detected tilt, and set a fixed amount of correction to be commonly applied to the plurality of images based on the detected tilt. The imaging device further includes another processing circuitry configured to correct the tilt of each of the plurality of images using the fixed amount of correction.

In still further aspect of this disclosure, there is provided an improved information processing method, including; acquiring a plurality of images of an object, each captured by an imaging device; obtaining information on an output of a sensor indicating a tilt of the imaging device with respect to a reference direction; setting a fixed amount of correction to be commonly applied to the plurality of images, based on the detected tilt; and correcting the tilt of each of the plurality of images using the fixed amount of correction.

In yet further aspect of this disclosure, there is provided an improved non-transitory recording medium storing a plurality of instructions which, when executed by one or more processors, cause the processors to perform an information processing method including: acquiring a plurality of images of an object, each captured by an imaging device; obtaining information on an output of a sensor indicating a tilt of the imaging device with respect to a reference direction; setting a fixed amount of correction to be commonly applied to the plurality of images, based on the detected tilt; and correcting the tilt of each of the plurality of images using the fixed amount of correction.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein:

FIG. 4A is a data flow diagram for describing generation of a spherical image;

FIG. 5 is an illustration for describing zenith correction and rotation correction of a spherical image;

Figure 1:
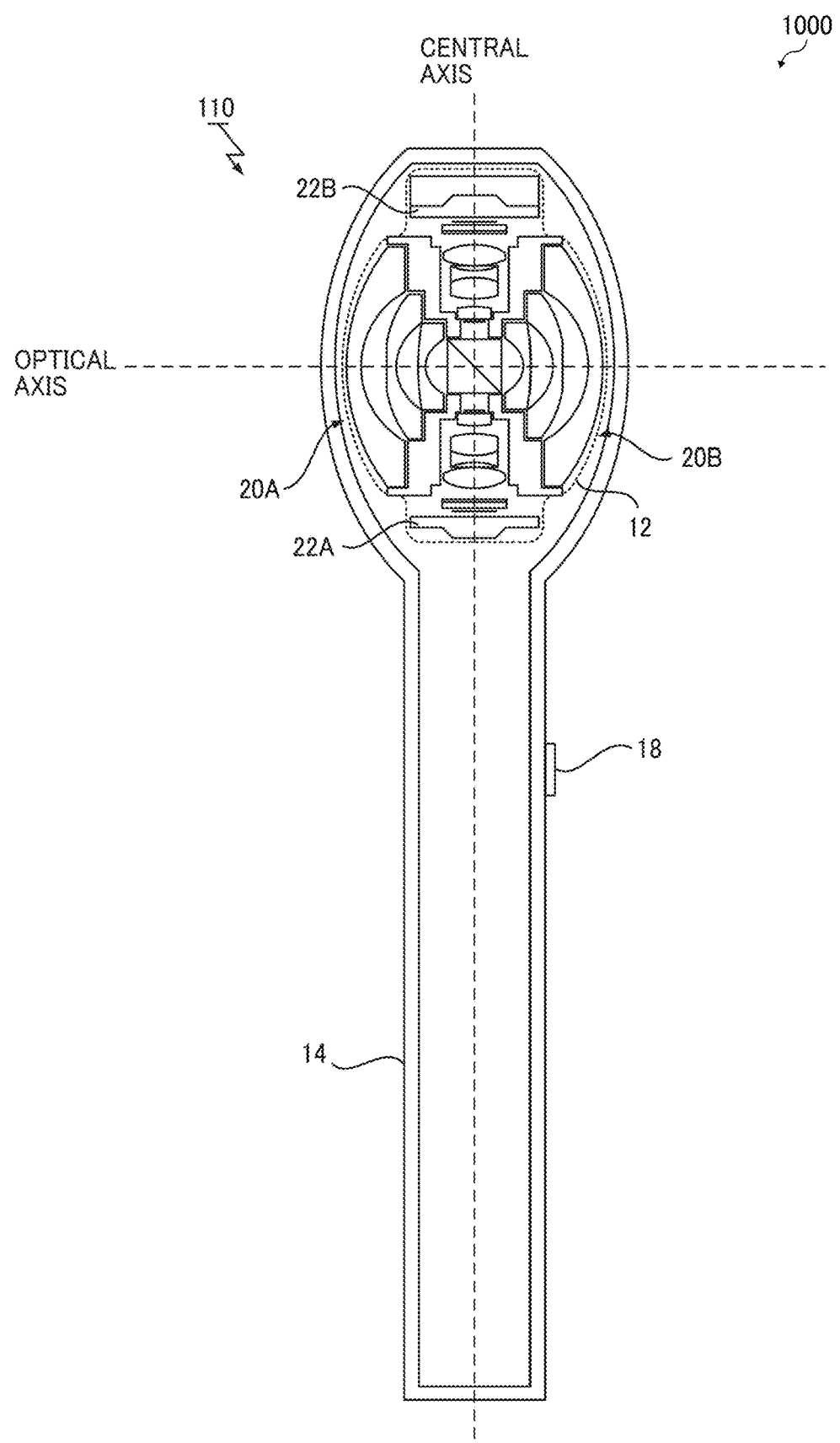
FIG. 1 is a cross-sectional view of a spherical-image camera according to an embodiment of the present disclosure.

The embodiments of the present disclosure provide an imaging device capable of preventing the viewers of captured images from feeling uncomfortable when the tilt correction is performed on the images.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise.

In describing preferred embodiments illustrated in the drawings, specific terminology is employed for the sake of clarity. However, the disclosure of this patent specification is not intended to be limited to the specific terminology so selected, and it is to be understood that each specific element includes all technical equivalents that have the same function, operate in a similar manner, and achieve a similar result.

Hereinafter, the overall configuration of a spherical-image processing system 1000 according to embodiments of the present disclosure will be described with reference to the drawings.

FIG. 1 is a cross-sectional view of a spherical-image camera 110 constituting the spherical-image processing system according to an embodiment of the present disclosure. The spherical-image camera 110 in FIG. 1 includes an imaging body 12, a casing 14 that holds the imaging body 12 and components such as a control board and a battery, and a shutter button 18 provided on the casing 14.

The imaging body 12 in FIG. 1 includes two image-forming optical systems 20A and 20B and two image sensors 22A and 22B. Examples of the image sensors 22A and 22B include charge-coupled devices (CCDs) and complementary metal oxide semiconductors (CMOSs). The image-forming optical systems 20A and 20B are hereinafter sometimes referred to collectively as an image-forming optical system 20. The image sensors 22A and 22B are hereinafter sometimes referred to collectively as an image sensor 22. Each of the image-forming optical systems 20A and 20B is configured as a fish-eye lens consisting of, for example, seven lenses in six groups. In the embodiment illustrated in FIG. 1, the above-mentioned fish-eye lens has a full angle of view of greater than 180 degrees (=360 degrees/n, where n denotes the number of optical systems and n is 2). Preferably, the fish-eye lens in FIG. 1 has an angle of view of 185 degrees or greater, and more preferably of 190 degrees or greater. One of such wide-angle image-forming optical systems 20 (20A and 20B) is combined with one of the image sensors 22 (22A and 22B) to constitute a wide-angle imaging optical system (20 and 22).

The relative positions of the optical elements (lenses, prisms, filters, and aperture stops) of the two image-forming optical systems 20A and 20B are defined with reference to the image sensors 22A and 22B. More specifically, these elements are positioned such that the optical axis of the optical element of each of the image-forming optical systems 20A and 20B meets the central portion of the light receiving area of corresponding one of the image sensors 22 at the right angle and such that the light receiving area serves as the image-forming plane of corresponding one of the fish-eye lenses.

In the embodiment illustrated in FIG. 1, the image-forming optical systems 20A and 20B have the same specification, and are combined facing the opposite directions such that the optical axes thereof match with each other. The image sensors 22A and 22B transform the light distribution of the received light into image signals, and sequentially output image frames to an image processing block of the control board. As will be described later in detail, the images captured by the respective image sensors 22A and 22B are combined to generate an image over a solid angle of $4\pi$ steradian (hereinafter, such an image is referred to as a "spherical image"). The spherical image is an image of all the directions that can be seen from an image capturing point. Thus-obtained consecutive frames of the spherical images captured at plural times form a spherical moving image. In the following embodiments, cases where a spherical still image and a spherical moving image are generated are described. Alternatively, a full-circle still image and a full-circle moving image, or a panoramic still image and a panoramic moving image may be generated. Note that such a panoramic image and moving image are obtained by photographing 360 degrees only in a horizontal plane. In the following, a still image and a moving image may be collectively referred to as an image.

Figure 2A:
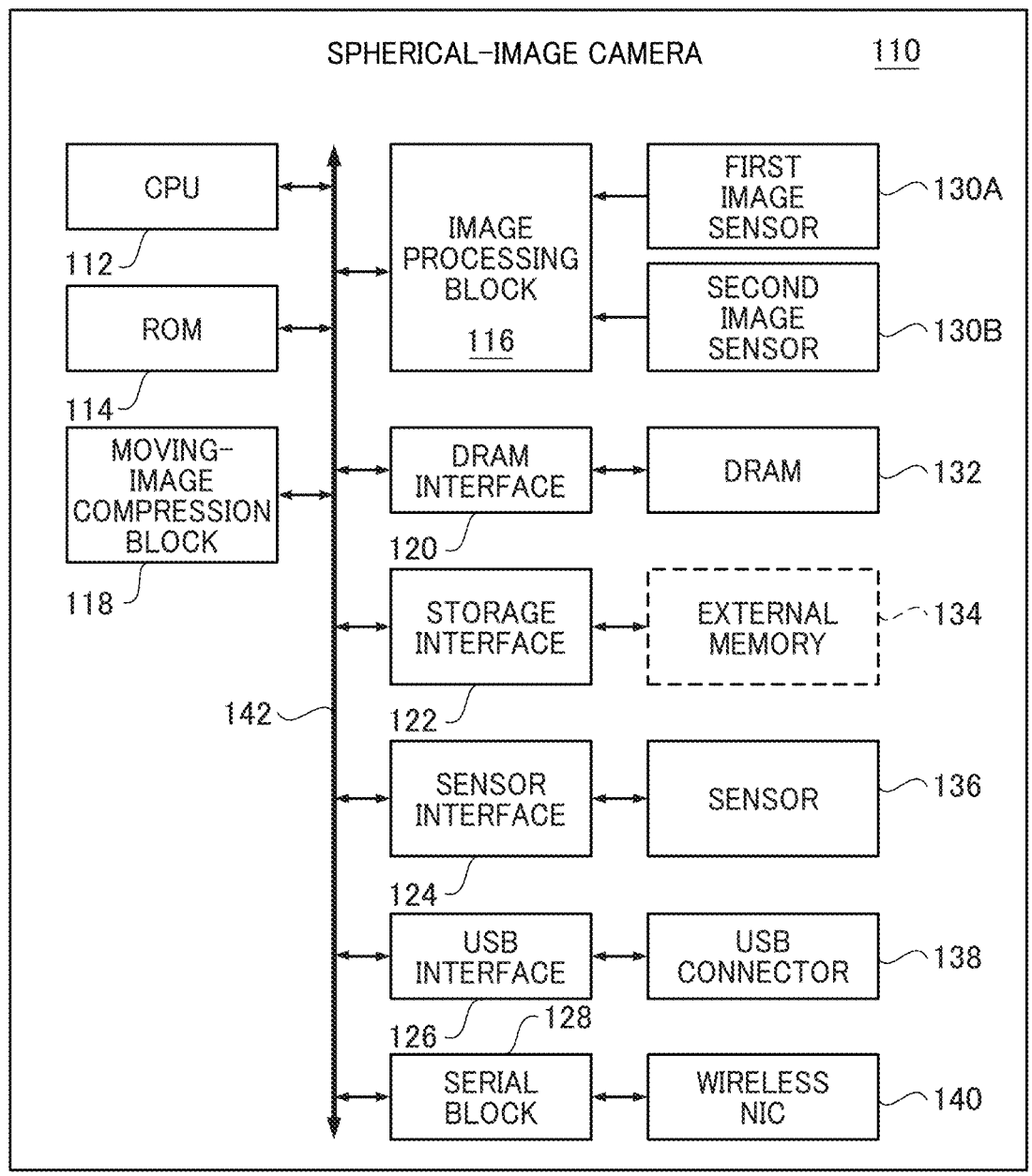
FIG. 2A is a block diagram of a hardware configuration of the spherical-image camera illustrated in FIG. 1.

FIG. 2A is a hardware block diagram of the control board of the spherical-image camera 110 that constitutes the spherical-image processing system according to an embodiment of the present disclosure.

The spherical-image camera 110 includes a central processing unit (CPU) 112 (a first CPU), a read only memory (ROM) 114, an image processing block 116, a moving-image compressing block 118, a dynamic random access memory (DRAM) 132 that is connected thereto through a DRAM interface 120, and a sensor 136 that is connected thereto through a sensor interface 124.

The CPU 112 controls entire operation of the spherical-image camera 110. The ROM 114 stores therein a control program described in a code readable by the CPU 112 and various kinds of parameters. In addition to the ROM 114, any desired memory such as an SSD for storing the control program may be provided. The image processing block 116 is connected to a first image sensor 130A and a second image sensor 130B (corresponding to the image sensors 22A and 22B in FIG. 1, respectively), and receives image signals of images captured by the image sensors 130A and 130B. The image processing block 116 includes, for example, an image signal processor (ISP), and applies, for example, shading correction. Bayer interpolation, white balance correction, and gamma correction to the image signals received from the image sensors 130A and 130B.

The moving-image compressing block 118 is a codec block for compressing and expanding a video such as that in MPEG-4 AVC/H.264 format. The DRAM 132 provides a storage area for temporarily storing data therein when various types of signal processing and image processing are applied.

The sensor 136 is a tilt sensor (tilt sensing means) capable of measuring tiling of an object with respect to a reference direction such as gravity's direction. In this example, the sensor 136 is an angular sensor for detecting three-axis acceleration components and three-axis angular velocity components. The detected acceleration component and angular velocity component are used to perform one or both of zenith correction of the spherical image in the direction of gravity (reference direction) and rotation correction around the direction of gravity as described later. The sensor 136 may further include a sensor such as a geomagnetic sensor for obtaining, for example, an azimuth angle.

The spherical-image camera 110 further includes a storage interface 122, a universal serial bus (USB) interface 126, and a serial block 128. The storage interface 122 is connected to an external memory 134. The storage interface 122 controls reading and writing of data from and to an external memory 134, such as a memory card inserted in a memory card slot. The USB interface 126 is connected to a USB connector 138. The USB interface 126 controls USB-based communication with an external device such as a smartphone via the USB connector 138. The serial block 128 controls serial communication with an external device such as a smartphone and is connected to a wireless network interface card (NIC) 140.

When the power is turned on by the operation of a power switch provided on the casing 14, the control program stored in the ROM 114 is loaded into a main memory such as a static random access memory (SRAM) and/or the DRAM 132, operating as a work area for the CPU 112. The CPU 112 executes the program read into the main memory to control the operations of the device, and temporarily stores the data required for the control in the main memory. Through this operation, the CPU 112 controls the spherical-image camera 110 to implement various types of function or perform various types of operation as will be described later. The control program may include, for example, firmware, an operating system (OS), and a plug-in application.

Figure 2B:
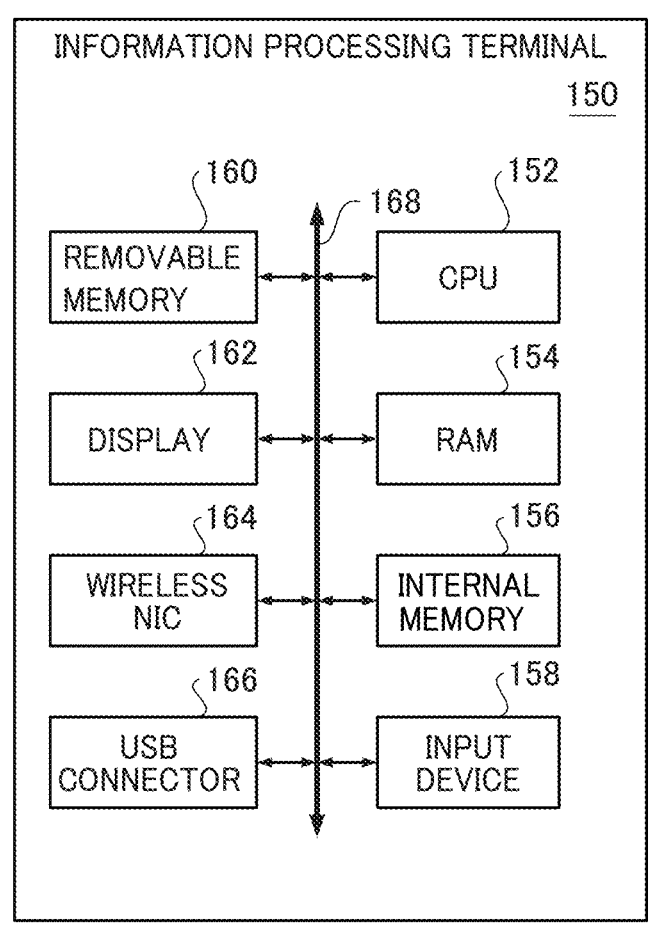
FIG. 2B is a block diagram of a hardware configuration of an information processing terminal according to an embodiment.

FIG. 2B is a hardware block diagram of the information processing terminal 150 constituting the spherical-image processing system according to the embodiment. Examples of the information processing terminal 150 include, but not limited to, a personal computer (PC), tablet, and smart phone.

The information processing terminal 150 in FIG. 2B includes a CPU 152, a RAM 154, an internal memory 156, an input device 158, a removable memory 160, a display 162, a wireless NIC 164, and a USB connector 166.

The CPU 152 controls entire operation of the information processing terminal 150. The RAM 154 provides the work area of the CPU 152. The internal memory 156, such as a ROM, stores therein an operating system (OS), and a control program such as an application that executes processes in the information processing terminal 150 according to the present embodiment, each of the operating system and the control program being written in a code decodable by the CPU 152.

The input device 158 is an input device, such as a touch screen, and provides a user interface. The input device 158 accepts various instructions from the operator, for example, an instruction for correcting the spherical image. The input device may be removable from the information processing terminal 150, such as when it is implemented by a mouse or keyboard. The removable memory 160 is a removable recording medium such as a memory card mounted, for example, in a memory card slot, and records various types of data, such as image data in a video format and still image data. The display 162, which may be implemented by a liquid crystal display (LCD), displays various information to the user, such as the corrected spherical image on the screen in response to the user operation. The wireless NIC 164 provides a wireless communication connection with an external device such as the spherical-image camera 110. The USB connector 166 provides a USB-based connection to an external device such as the spherical-image camera 110.

When the information processing terminal 150 is powered on and the power is supplied, the control program is read from the internal memory 156 and loaded into the RAM 154. The CPU 152 controls entire operation of the information processing terminal 150 and temporarily stores the data required for the control in the RAM 154, according to the control program read into the RAM 154. This operation implements functional units and processes of the information processing terminal 150, as will be described later.

Hereinafter, a spherical-image correction function performed by the spherical-image processing system according to the present embodiment are described with reference to FIGS. 3 to 6.

Figure 3:
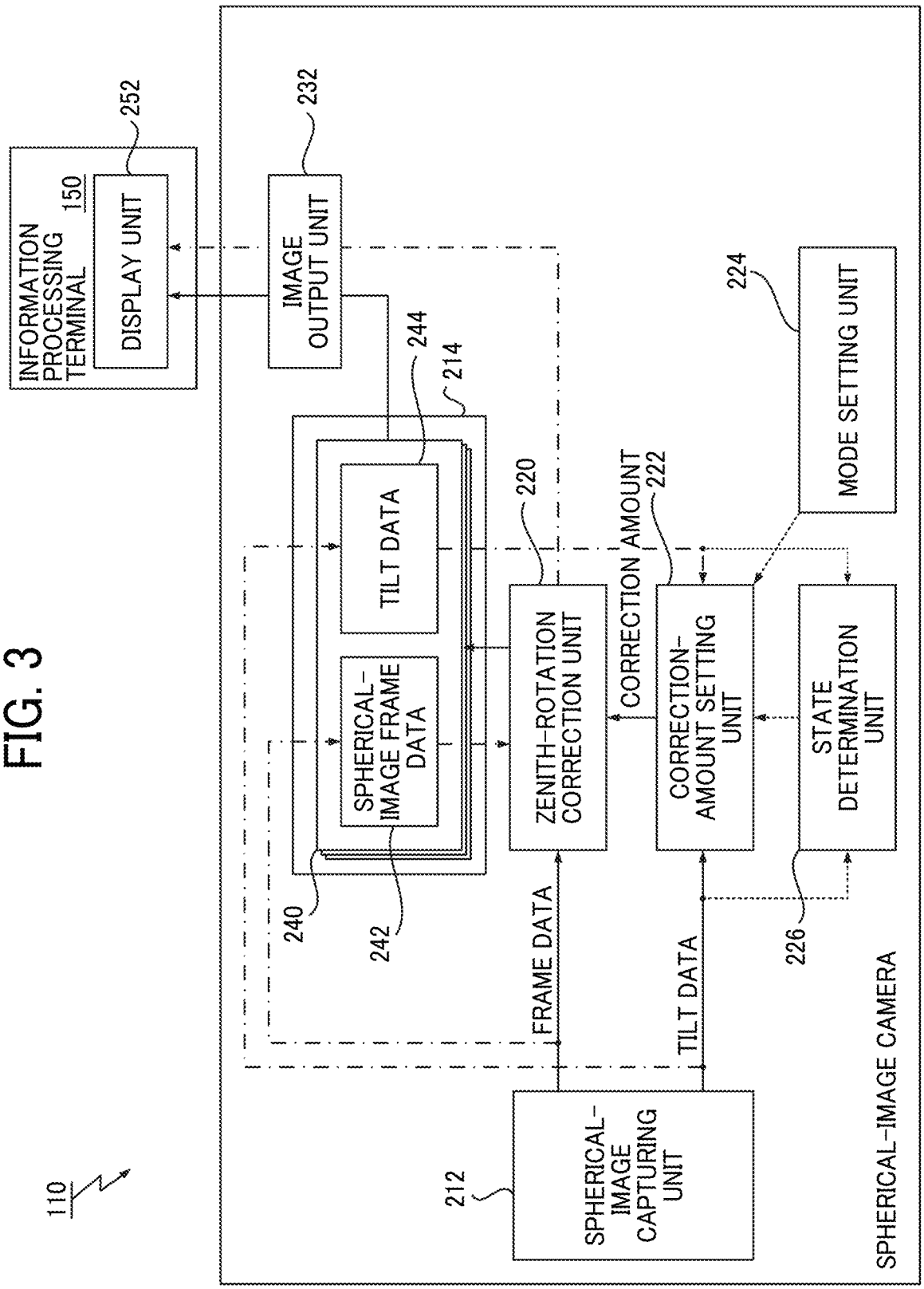
FIG. 3 is a block diagram of a functional configuration relevant to a spherical-image correcting capability implemented on a spherical-image processing system according to an embodiment.

FIG. 3 is a block diagram of a spherical-image correction function implemented on the spherical-image processing system according to the present embodiment. As illustrated in FIG. 3, the spherical-image camera 110 includes a spherical-image capturing unit 212, a storage unit 214, a zenith-rotation correction unit 220, and an image output unit 232.

The spherical-image capturing unit 212 sequentially captures frames using the two image sensors 130A and 130B, and outputs the spherical-image frame data. Further, the spherical-image capturing unit 212 (acquiring means) measures acceleration components in the three axial directions and angular velocity components in the three axial directions using the sensor 136, and outputs, as metadata, tilt data including the measurement results. The output spherical-image frame data and tilt data are recorded in the storage unit 214 as the spherical-image data after a correction to be described below (one or both of the zenith correction and the rotation correction) is applied or as is. The spherical-image capturing unit 212 is implemented by, for example, the image-forming optical systems 20 (image sensors 130A and 130B in FIG. 2A), image processing block 116, and moving-image compression block 118, each operating under control of instructions from the CPU 112.

The storage unit 214 stores one or more spherical-image data 240 captured by the spherical-image capturing unit 212. The storage unit 214 is a storage area of the external memory 134 or another memory in FIG. 2A. Since the storage unit 214 can be implemented by an external memory, the storage unit 214 may be provided outside the spherical-image camera 110, such as any memory provided in the information processing terminal 150. As illustrated in FIG. 3, the spherical-image data 240 includes the spherical-image frame data 242 captured by the spherical-image camera 110 and the tilt data 244 that is the data regarding the tilt angle relative to the reference direction and the rotation angle around the reference direction of the spherical-image camera 110 during the shooting operation.

If the spherical-image data 240 is a still image, the spherical-image frame data 242 includes one frame of image data. If the spherical-image data 240 is a moving image, the spherical-image frame data 242 includes a plurality of frames of image data each captured during the time period from the start to the end of the shooting, which together form a spherical moving image. The spherical-image data 240 may be one still image or a video (moving) image at a predetermined rate, such as 30 frames per second (fps), 33 fps, or 60 fps). In the embodiments to be described, the spherical-image data 240 is described as interval-shot images (recorded as consecutive still images) captured by the interval shooting at predetermined-time intervals (usually at longer time intervals than the rate of the video image) or a time-lapse moving image in the form of a moving image of the interval-shot images.

Figure 4B:
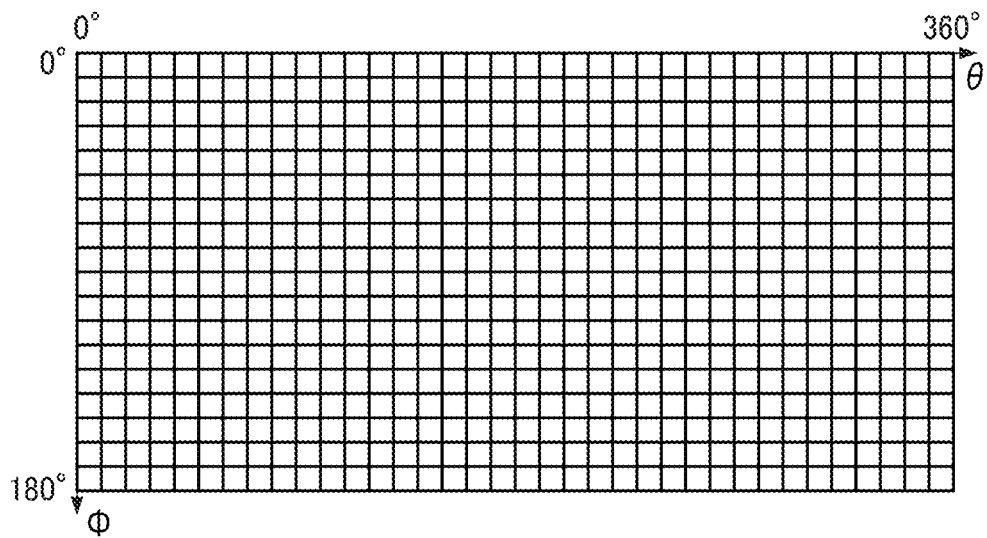
FIG. 4B is an illustration of a planar data structure of a spherical image.

Hereinafter, a process of generating a spherical image and a generated spherical image are described with reference to FIGS. 4A, 4B, and 4C. FIG. 4A is an illustration of the data structure of each image and the data flow of the image in the process of generating a spherical image. First, an image directly captured by each of the image sensors 130A and 130B is an image that roughly covers a hemisphere of the whole sphere as a field of view. Light that passes through the image-forming optical system 20 is focused on the light receiving area of the image sensor 130 to form an image according to a predetermined projection system. The image sensor 130 is a two-dimensional image sensor whose light-receiving area defines a planar area. Accordingly, the image formed by the image sensor 130 is image data represented by the plane coordinate system. A formed image is configured as a typical fish-eye image that contains an image circle as a whole in which each captured area is projected, as illustrated in a fish-eye image A and a fish-eye image B in FIG. 4A.

A plurality of fish-eye images of each frame captured by the plurality of image sensors 130 is subjected to the distortion correction and synthesis processing to form a spherical image for each frame. In the synthesis processing, two spherical images each including a complementary hemispherical portion are generated from the fish-eye images each configured as a planar image. Then, the two spherical images including the respective hemispherical portions are joined together by matching the overlapping areas of the hemispherical portions, and the spherical images are synthesized to generate a full spherical (omnidirectional) image including the whole sphere.

FIG. 4B is an illustration of a planar data structure of the image data of a spherical image used in the embodiment of the present disclosure. FIG. 4C is an illustration of a spherical data structure of the image data of the spherical image. As illustrated in FIG. 4B, the image data of the spherical image is expressed as an array of pixel values in the coordinates defined by the vertical angle $\varphi$ corresponding to the angle with reference to a referential axis and the horizontal angle $\theta$ corresponding to the angle of rotation around the referential axis. The vertical angle $\varphi$ ranges from 0° to 180° (alternatively from −90° to +90°), and the horizontal angle $\theta$ ranges from 0° to 360° (alternatively from −180° to +180°).

Figure 4C:
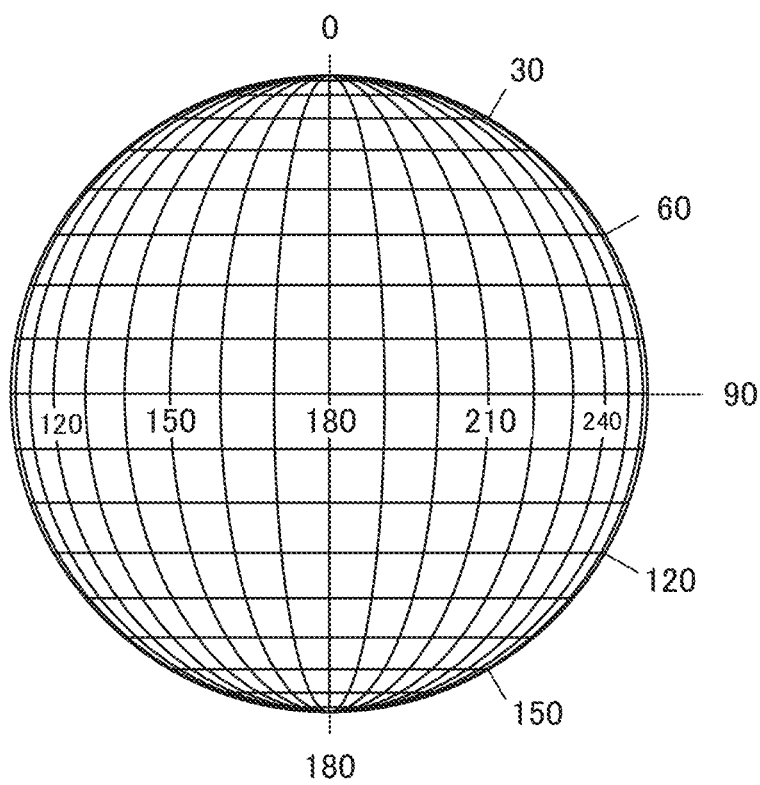
FIG. 4C is an illustration of a spherical data structure of the spherical image.

As illustrated in FIG. 4C, the respective coordinate values ($\theta$, $\varphi$) of the spherical image format (the spherical data structure of the image data) are associated with the points on the sphere that represents all directions from the photographing location. Thus, all directions are associated with the points on the spherical images. The plane coordinates of the fish-eye image captured by a fish-eye lens are associated with the coordinates on the sphere of the spherical image, which are included in a predetermined transformation table. The transformation table includes data prepared in advance by, for example, a manufacturer in accordance with a predetermined projection model based on design data of each lens optical system. The data of the transformation table is used for transforming a fish-eye image into a spherical image.

In the description above, the spherical-image frame data 242 is assumed to constitute a spherical image. However, no limitation is intended thereby. There is no need for each frame to be recorded on the format of the synthesized spherical image (synthesized spherical image format) illustrated in FIG. 4C. The spherical-image frame data 242 may be recorded in any form as long as a spherical image can be constructed at the time of reproduction.

For example, assuming that fish-eye images for each frame are subjected to the distortion correction and synthesis processing to generate a spherical image at the time of the viewing, the still-image data or moving-image data of two fish-eye images directly captured by the image sensors 130A and 130B (the respective pieces of the still-image data or moving-image data corresponding to the fish-eye image A and the fish-eye image B in FIG. 4A) is recorded as the spherical-image frame data 242. Alternatively, the still-image data or moving-image data of the image formed by joining together the two fish-dye images A and B (that is the still-image data or moving-image data of one image formed by joining together the fish-eye image A and the fish-eye image B arranged side by side) may be recorded as the spherical-image frame data 242. In the following description, the spherical-image frame data 242 is assumed to contain images of each frame in the distortion-corrected and synthesized spherical-image format, for convenience of description.

The still image may be recorded in any form as long as the still image can be reproduced. Examples of a data format of the still image include, but not limited to, joint photographic experts group (JPEG), portable network graphics (PNG), and bitmap (BMP). Similarly, a moving image (including a video image and a time-lapse moving image) may be recorded in any form as long as the moving image can be reproduced. For example, the spherical-image frame data 242 is recorded as moving-image data in which a plurality of frames are compressed in a certain codec such as H.264/MPEG-4 advanced video coding (AVC) or H.265/High Efficiency Video Coding (HEVC). Further, although Joint Photographic Experts Group (JPEG) is a format that expresses a moving image as continuous still images, the moving-image data may be recorded as a continuous series of still images of a plurality of frames. Further, the interval-shot images may be recorded as a set of a plurality of still image files, or may be recorded as a single file including a plurality of still images.

The following description is made with reference to FIG. 3. In the case of a still image, the tilt data 244 is data of a tilt angle relative to the reference direction of the spherical-image camera 110 at the time of capturing the image, and is recorded in association with a spherical image. In the case of a moving image, the tilt data 244 is time-series data of the tilt angle relative to the reference direction of the spherical-image camera 110 during the time from a start to an end of a shooting operation. The time series data is recorded in association with each frame of a spherical image. Typically, the reference direction of the spherical-image camera 110 is the direction of gravity in which acceleration of gravity is applied. The tilt angle relative to the direction of gravity is generated based on the signal measured by the acceleration sensor included in the sensor 136. Since the acceleration sensor does not distinguish between gravity and inertial force, preferably the tilt angle obtained from the acceleration sensor of the sensor 136 may be corrected based on the signal measured by the angular velocity sensor. Further, in addition to the tilt angle relative to the reference direction, the tilt data 244 may include information on the rotation angle around the reference direction. The information on the rotation angle may be based on the angular velocity generated around the three axes of the spherical-image camera 110 (internal angular velocity sensor) measured from the angular velocity sensor of the sensor 136 during the time from a start to an end of the shooting. The tilt data 244 is stored as metadata for the spherical-image frame data, for example.

In the embodiments to be described, it is assumed that the information on the tilt angle or the rotation angle corresponds to the frames on a one-by-one basis. When still images are captured, a tilt angle or a rotation angle is recorded for each image. When a moving image is captured, the frames are recorded in synchronization with the tilt angle or the rotation angle. However, the rate of the tilt angle to be recorded may not be the same as the frame rate. When the rate of the tilt angle is not the same as the frame rate, the tilt angle or the rotation angle that corresponds to the frame on a one-by-one basis is obtained by, for example resampling at the frame rate. Further, there is no need to record the angles at regular intervals. In this case, by using the time stamp, the relations between the frames and the tilt angles are obtained at a later time. Further, there is no need for the tilt angle and the rotation angle to be acquired and stored at the same sampling cycle, and the tilt angle and the rotation angle are not prevented from being configured as individual sets of time series data.

The zenith-rotation correction unit 220 (tilt correction means), which may be implemented by instructions from the CPU 112, executes the tilt correction (at least one of the zenith correction and the rotation correction) on each frame image of the spherical-image frame data based on the information regarding the tilt (the tilt angle relative to the reference direction and the rotation angle around the reference direction) associated with each frame in the tilt data. Then, the zenith-rotation correction unit 220 outputs the corrected spherical-image data. The tilt correction by the zenith-rotation correction unit 220 may be performed by reading the spherical-image data 240 temporarily stored in the storage unit 214 after shooting. Alternatively, the tilt correction may be performed based on the spherical-image frame data and the tilt data output from the spherical-image capturing unit 212 during the shooting. The spherical-image data corrected by the zenith-rotation correction unit 220 may also be recorded in the storage unit 214 or transmitted to the display unit 252 of the information processing terminal 150 and displayed on the screen.

Figure 6A:
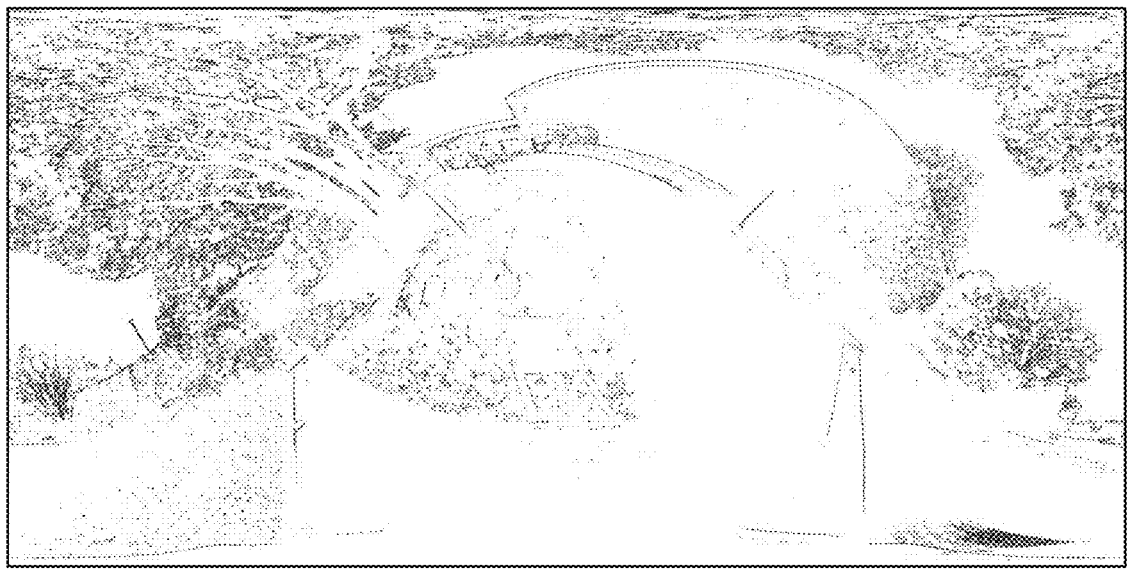
FIGS. 6A and 6B (FIG. 6) are illustrations of a spherical image obtained by performing the zenith correction and the rotation correction.
Figure 6B:
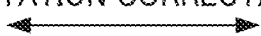
Figure 6B:
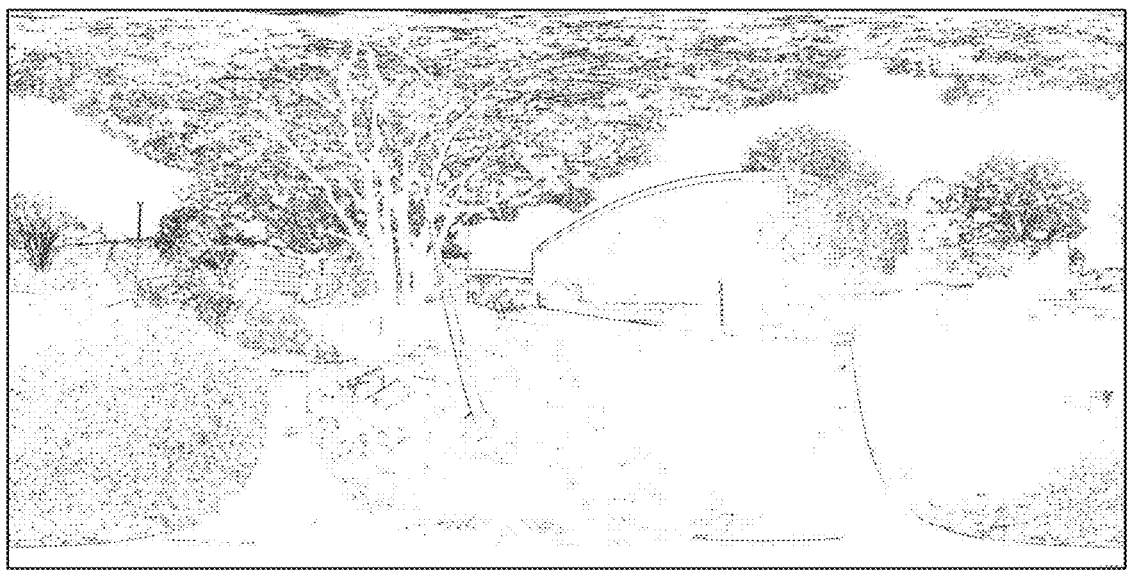

The following describes the zenith correction and the rotation correction with reference to FIGS. 5, 6A, and 6B. FIG. 5 is an illustration of the zenith correction and the rotation correction applied to a spherical image in the embodiment. FIGS. 6A and 6B (FIG. 6) are illustrations of a spherical image obtained by performing the zenith correction and the rotation correction in the embodiment. FIG. 6A indicates an image frame before the zenith correction is applied, and FIG. 6B indicates an image frame after the zenith correction is applied.

As described above, the image data in a spherical image format is expressed as an array of pixel values in the coordinates defined by the vertical angle φ corresponding to an angle with reference to the axis z0 and the horizontal angle θ corresponding to an angle of rotation around the axis z0. If no correction is made, the axis z0 is defined based on the spherical-image camera 110. For example, the axis z0 that defines the horizontal angle θ and the vertical angle φ, is defined as the central axis passing through the center of the casing 14 from the bottom to the top where the top is the imaging body 12 side and the bottom is the opposite side of the imaging body 12 in FIG. 1. Further, for example, the horizontal angle θ of a spherical image is defined such that the direction of the optical axis of the optical element of one of the image-forming optical systems 20A and 20B is positioned at the horizontal angle θ, at the center of the corresponding image sensor 22.

The zenith correction (correction in the direction of roll and the direction of pitch) is correction processing that corrects the spherical images (FIG. 6A) captured with the central axis z0 actually tilted relative to the reference direction Z (the direction of gravity) as illustrated in the left of FIG. 5, to a spherical image (FIG. 6B) captured with the central axis z0 aligned with the reference direction Z as illustrated in the right of FIG. 5. The rotation correction is a correction (correction in Yaw direction) that reduces rotational distortion around the reference direction Z (in the horizontal angle θ direction in FIGS. 6A and 6B) in the spherical image to which the zenith correction has been made to have the central axis z0 aligned with the reference direction Z. In this case, as a method of correcting the Yaw direction, there are a method of matching the Yaw direction with the initial angle and a method of fixing the Yaw direction at a predetermined direction (for example, north).

When an image of each frame in the frame data is an image in the synthesized spherical-image format, the zenith-rotation correction unit 220 performs the rotational coordinate transformation on the spherical image of each frame based on the determined amount of correction (correction amount). When each frame in the frame data includes a plurality of fish-eye images, which are images before the synthesis processing is performed, the zenith-rotation correction unit 220 applies the zenith correction and the rotation correction to each frame based on the determined amount of correction, and also transforms the plurality of fish-eye images into a spherical image.

In the embodiment to be described, it is assumed that the zenith correction is performed based on the tilt angle relative to the reference direction, and the rotation correction is performed based on the rotation angle around the reference direction. In the tilt correction, both of the zenith correction and the rotation correction are assumed to be performed. However, this is only one example. Alternatively, one of the tilt angle and the rotation angle may be used to perform corresponding one of the zenith correction and the rotation correction.

Hereinafter, the operation of the tilt correction performed by the zenith-rotation correction unit 220 is described in detail with reference to FIG. 3. As illustrated in FIG. 3, the spherical-image camera 110 according to at least one embodiment further includes a correction-amount setting unit 222, a mode setting unit 224, and a state determination unit 226.

The correction-amount setting unit 222 sets the amount of correction used for the tilt correction (the tilt angle and the rotation angle) performed by the zenith-rotation correction unit 220 as described above. More specifically, the correction-amount setting unit 222 sets a fixed value, or a fixed amount of correction, for the tilt correction (the tilt angle and the rotation angle) in cooperation with the mode setting unit 224 and the state determination unit 226, such that the fixed amount of correction is set for a plurality of frame images (a plurality of still-image frames or a plurality of frame images in a time-lapse moving image recorded by the interval shooting). To make the amount of correction fixed (to set a fixed amount of correction) means to make the amount of correction the same between the images, each tilt of which is to be corrected. That is, the same value is set as a correction value to be used for correcting the tilt for a plurality of frame images. However, the same amount of correction may not be the exact same amount as long as the amount of correction does not affect an image. Note that the fixed amount of correction is set based on at least one tilt value detected by the sensor 136 at the time of capturing at least one of the first image, the last image, and the intermediate image among a plurality of images continuously shot (captured). In some embodiments, the amount of correction that has been set based on the tilt value of the first frame may be used for the other frames subsequent to the first frame. In some other embodiments, the amount of correction may be set based on the average of a plurality of tilt values, and used in common to correct a plurality of frame images. The correction-amount setting unit 222 constitutes correction-amount setting means in the present embodiments.

The mode setting unit 224 is used when the correction-amount setting unit 222 sets the amount of correction for the tilt correction. The mode setting unit 224 sets, for example, a fixed-correction mode in which the amount of correction is fixed or a follow-up correction mode in which the amount of correction is not fixed.

The fixed-correction mode is a mode in which the tilt correction is performed with the amount of correction fixed under the assumption that the viewpoint (the camera) is stationary during the continuous shooting. That is, any mode for performing the tilt correction with the amount of correction fixed is collectively referred to as the fixed-correction mode, such that a plurality of modes may be categorized as the fixed-correction mode. For example, it is presumed that the interval shooting is usually performed with the viewpoint fixed. Accordingly, the fixed-correction mode may be set for the interval shooting mode at any time. However, a plurality of modes, such as an interval shooting (fixed-correction) mode and an interval shooting (follow-up correction) mode, may be prepared for the interval shooting. These modes are prepared under the following assumption, when a tripod that is made stationary is used in the interval shooting, the viewpoint is fixed so that a fixed amount of correction is preferably used. Further, when a photographer holds the camera with the hand during the interval shooting, the viewpoint might be shifted, and such a shifted viewpoint is preferably corrected with a regular tilt correction that follows up the shift of the viewpoint. In such a case, the fixed-correction mode may be set when the interval shooting (fixed-correction) mode is selected. Such a specific mode is selected by a user as needed, using the application installed on the information processing terminal 150 connected to the spherical-image camera 110 or operating a button of the spherical-image camera 110.

The mode setting unit 224 constitutes mode setting means in the embodiments. In some embodiments, the correction-amount setting unit 222 sets a fixed amount of correction used for images of a plurality of frames when the mode setting unit 224 sets the fixed-correction mode.

The state determination unit 226 monitors an output (data regarding the tilt) from the sensor 136, and determines whether the viewpoint is at a fixed state during the shooting based on the change in the tilt. For example, when the change in the tilt (tilt value) detected by the sensor 136 is sufficiently small (when the fluctuation range relative to the initial value or the average value is less than or equal to the threshold value), it is determined that the viewpoint is fixed regardless of a minute change in the sensor output. The state determination unit 226 constitutes state determination means in the embodiments. In some embodiments, when the state determination unit 226 determines that the viewpoint is fixed, the correction-amount setting unit 222 determines that a fixed amount of correction is used in common for all the images of a plurality of frames.

The user may preset as appropriate whether the correction-amount setting unit 222 sets the amount of correction based on the mode set by the mode setting unit 224 or the determination result of the state determination unit 226. For example, in addition to the above-described interval shooting (fixed-correction) mode and interval shooting (follow-up correction) mode, an interval shooting (automatic for the same interval shooting described above, an interval shooting (automatic discrimination) mode may be prepared for the interval shooting. In such a case, when the interval shooting (fixed-correction) mode is selected, the determination is made by the correction-amount setting unit 222 based on the mode set by the mode setting unit 224. When the interval shooting (automatic discrimination) mode is selected, the determination is made by the correction-amount setting unit 222 based on the determination result of the state determination unit 226.

In the embodiment to be described, it is assumed that the spherical-image camera 110 includes both the mode setting unit 224 and the state determination unit 226, and the mode setting unit 224 and the state determination unit 226 are switchable according to a selection of the user. However, no limitation is intended thereby. In some other embodiments, only one of the mode setting unit 224 and the state determination unit 226 may be implemented on the spherical-image camera 110, and the determination is made based on the result of the one implemented on the spherical-image camera 110.

Hereinafter, a functional configuration of the information processing terminal 150 is described with reference to FIG. 3. As illustrated in FIG. 3, the information processing terminal 150 includes a display unit 252. The information processing terminal 150 may further include an operation unit. The display unit 252 is used to view the spherical-image data. The display unit 252 may be implemented by, for example, the display 162 that operates under control of the CPU 152. The operation unit is implemented by, for example, the input device 158.

The information processing terminal 150 receives a user instruction to view a corrected spherical image at the operation unit, and sends a request for correcting a spherical image and view a corrected spherical image to the spherical-image camera 110. When the spherical-image camera 110 receives from the information processing terminal 150 a request (for example, a request for correcting a spherical image to view a corrected spherical image), the zenith-rotation correction unit 220 receives such a request. In response to the request for correcting the spherical image, the zenith-rotation correction unit 220 performs the zenith correction and the rotation correction on a specified spherical-image data 240, and then outputs data of a corrected image. The image output unit 232 outputs the spherical image on which the zenith correction and the rotation correction have been performed by the zenith-rotation correction unit 220 to the information processing terminal 150 that is the request sender terminal. The image output unit 232 may be implemented by, for example, the serial block 128 and the wireless NIC 140, under control of the CPU 112.

The information processing terminal 150 is a terminal device such as a smartphone, a tablet computer, and a personal computer in which an application for communicating with the spherical-image camera 110 to view and reproduce spherical images is installed. The information processing terminal 150 receives various instructions from the operator via the application and issues various requests to the spherical-image camera 110. In response to accepting an instruction of the operator to correct a spherical image designated by the operator (for example, an instruction to display images captured by interval shot for viewing while correcting), the information processing terminal 150 issues, to the spherical-image camera 110, a request to output image data of a certain corrected spherical image. The display unit 252 of the information processing terminal 150 displays a spherical image on the display device such as the display 162 of the information processing terminal 150 based on the image data output from the spherical-image camera 110.

Note that the information processing terminal 150 displays, on the display 162, any desired type of image based on the corrected image data. For example, the spherical image as is may be displayed on the display 162. Alternatively, the spherical image may be pasted on the spherical object, and images captured when the spherical object is observed with a camera of a predetermined viewing angle from a predetermined position are displayed as frames.

In the embodiment to be described, the description is given assuming that the spherical image is displayed on the screen of the display 162 of the information processing terminal 150, but the embodiment is not limited to this. In an embodiment in which the spherical-image camera 110 is provided with a display device, a spherical image may be displayed on a screen of the display device in the spherical-image camera 110. In an alternative embodiment where the spherical-image camera 110 is connected to a display device with a wireless video communication protocol such as Miracast (registered trademark) or a wired video communication protocol such as HDMI (registered trademark), a spherical image may be displayed on the screen of the display device connected to the spherical-image camera 110.

Further, the correcting process may be started at any desired time if it is before the viewing. In some embodiments, the tilt correction is performed on a captured image of each frame based on the tilt detected by the sensor 136 during the shooting, and the image on which the tilt correction has been performed is stored as the spherical-image data 240. Alternatively, as described above, a captured image is stored without correction at the time of shooting, and is recorded as the spherical-image data 240. When a request for viewing is instructed by a user, the recorded spherical-image data 240 is read out, and the tilt correction is performed on the image based on the tilt recorded in association with the image. When data is stored without correction at the time of shooting and the correction is performed before viewing, the fixed-correction mode as a correction mode may be designated afterwards regardless of the shooting mode at the time of shooting.

In the embodiment to be described, the description is given assuming that the above-described zenith-rotation correction unit 220, the correction-amount setting unit 222, the mode setting unit 224, and the state determination unit 226 are implemented on the spherical-image camera 110. In the embodiment, the zenith correction and the rotation correction processes are actually performed using the resources of the spherical-image camera 110, not the information processing terminal 150, and the correction result is output to the information processing terminal 150 to display a corrected image. With this configuration, regardless of the processing capability of the information processing terminal 150, it is possible to stably reproduce moving-images while applying the zenith correction and the rotation correction to images. However, in some other embodiments, at least some steps of the correcting process may be performed on the information processing terminal 150 side. Further, all of the steps of the correcting process may be performed on the information processing terminal 150 side as an information processing device.

Figure 7:
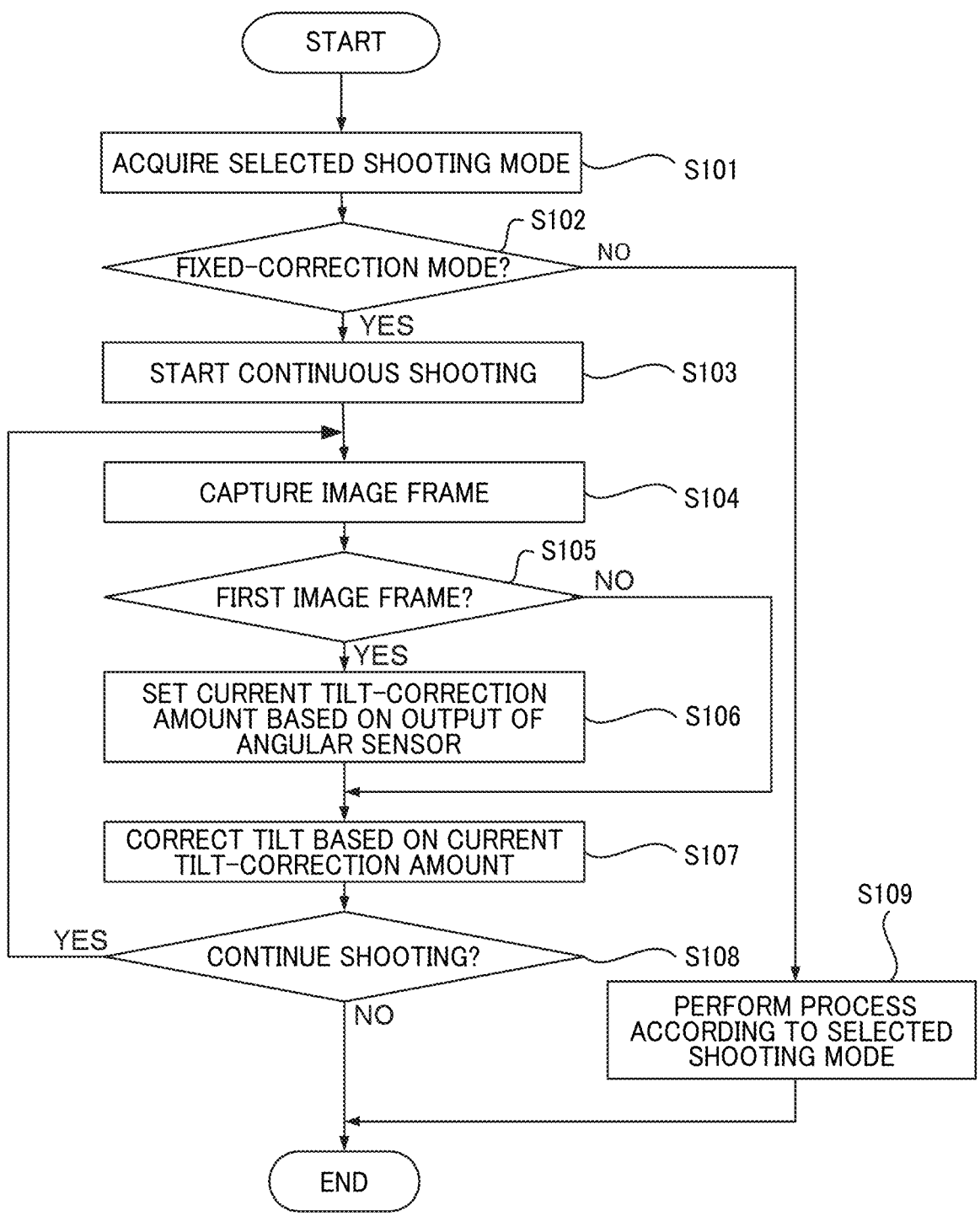
FIG. 7 is a flowchart of the spherical-image correcting process based on the determination of the mode during the shooting of spherical images, performed by the spherical-image camera according to an embodiment.
Figure 8:
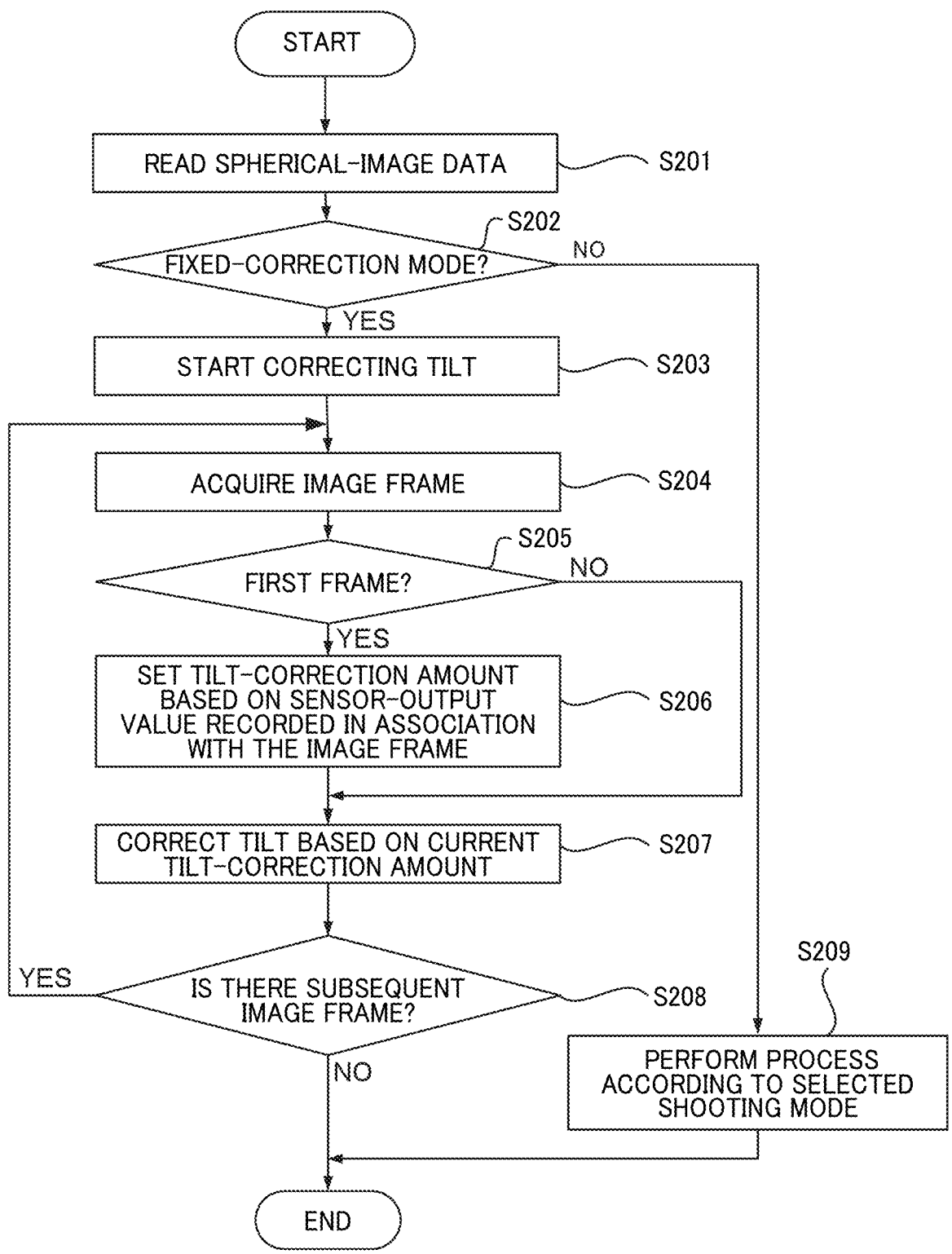
FIG. 8 is a flowchart of the spherical-image correcting process based on the determination of the mode during the viewing of the spherical images, performed by the spherical-image camera according to an embodiment.
Figure 9:
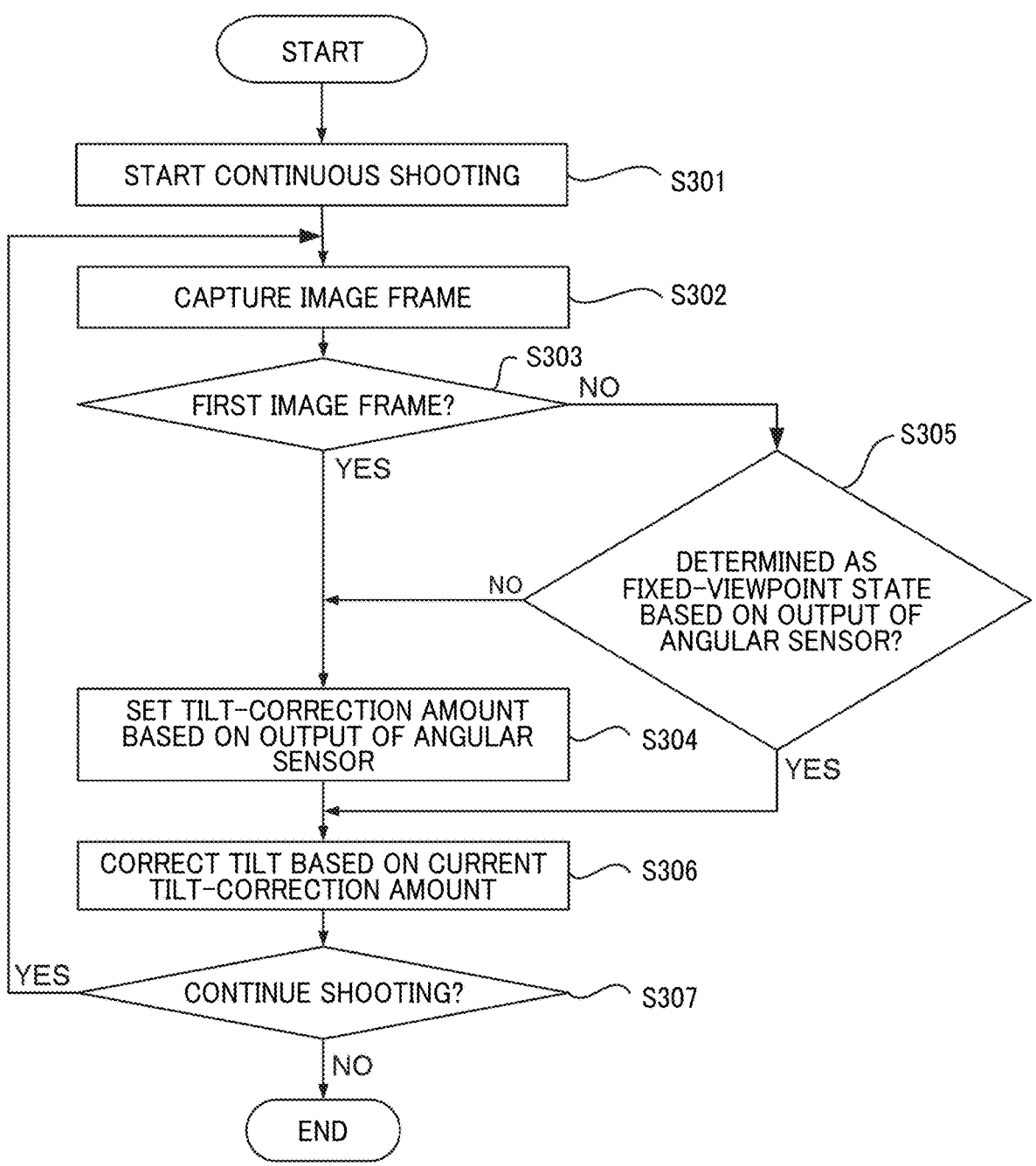
FIG. 9 is a flowchart of the spherical-image correcting process based on the determination of the state during the shooting of the spherical images, performed by the spherical-image camera according to an embodiment.
Figure 10:
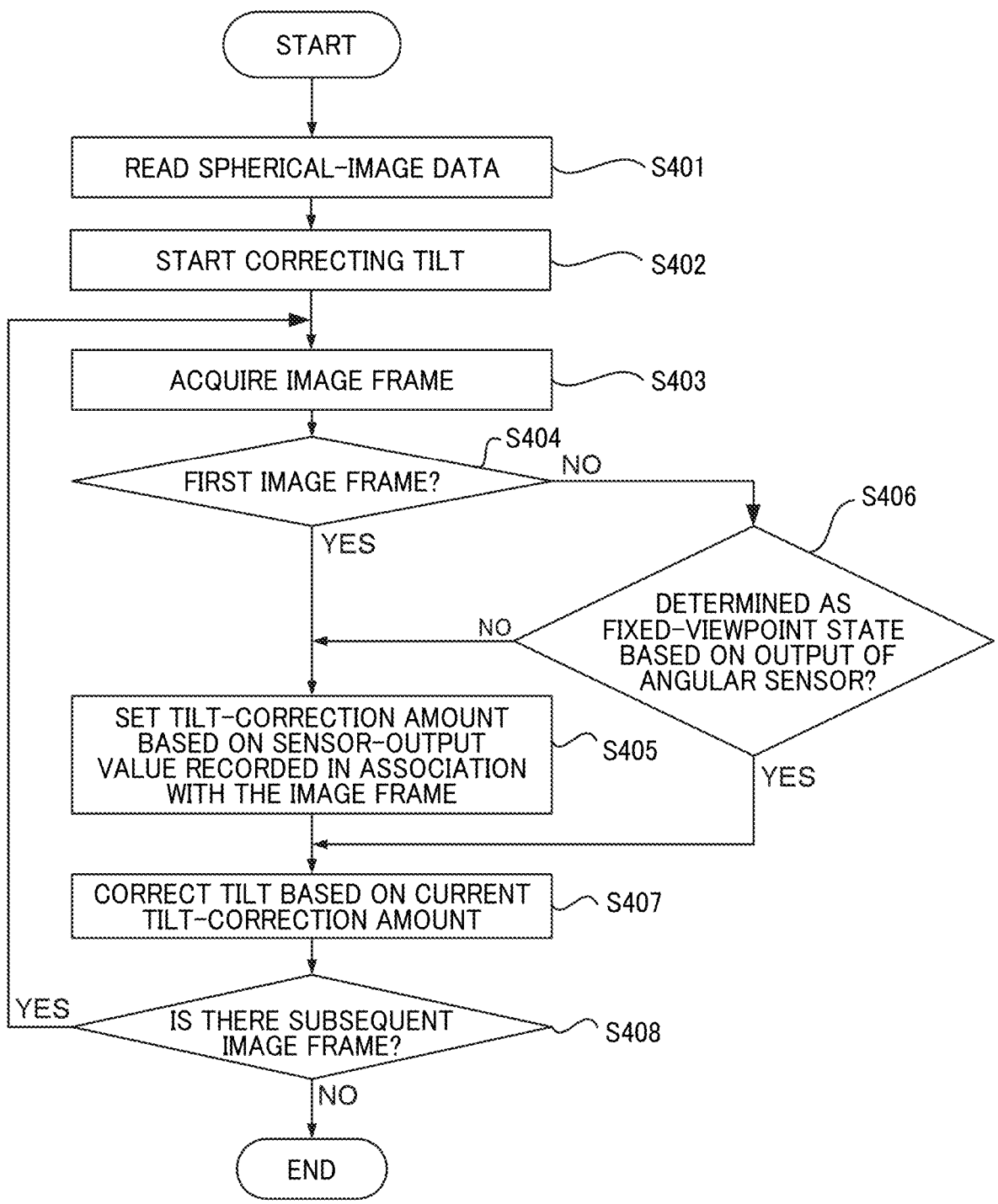
FIG. 10 is a flowchart of the spherical-image correcting process based on the determination of the state during the viewing of the spherical images, performed by the spherical-image camera according to an embodiment.

Hereinafter, the process of correcting a spherical image (the spherical-image correcting process) performed by the spherical-image camera according to an embodiment is described in detail with reference to FIGS. 7 to 10. FIGS. 7 and 8 illustrate the correcting process performed based on the set mode during the shooting and the viewing, respectively. FIGS. 9 and 10 illustrate the correcting process performed based on the determination of the state during the shooting and the viewing, respectively.

FIG. 7 is a flowchart of the process of correcting a spherical image performed by the spherical-image camera 110 based on a mode set during the shooting in an embodiment. As illustrated in FIG. 7, the spherical-image camera 110 starts the process in response to a request for shooting from a user, which may be received via the information processing terminal 150.

In step S101, the spherical-image camera 110 acquires a currently selected shooting mode from the mode setting unit 224. In step S102, the mode setting unit 224 of the spherical-image camera 110 sets the fixed-correction mode or the follow-up correction mode based on the selected shooting mode. The mode setting unit 224 sets the fixed-correction mode when the interval shooting mode is selected when there is only one kind of interval shooting mode prepared, or when the interval shooting (fixed-correction) mode that uses a fixed amount of correction is selected from a plurality of optional interval shooting modes. When the fixed-correction mode is not set (NO in step S102), that is, when the follow-up correction mode is set, any desired process according to the selected shooting mode (for example, the usual interval shooting in which the amount of correction is dynamically set for each frame) is performed in step S109. Then, the spherical-image camera 110 ends the process.

When the fixed-correction mode is set (YES in step S102), the process proceeds to step S103. The spherical-image camera 110 starts continuous shooting in step S103, and captures an image frame in step S104. In step S105, the correction-amount setting unit 222 determines whether the captured image frame is the first image frame. When the correction-amount setting unit 222 determines that the captured image frame is the first image frame (YES in step S105), the process proceeds to step S106. In step S106, the correction-amount setting unit 222 of the spherical-image camera 110 sets the amount of correction (the amount of correction that enables the detected tilt to be cancelled out) for the tilt correction process based on an output from the sensor 136. The correction-amount setting unit 222 may store the amount of correction, which is set, in a memory at least temporally for later use. Then, the process proceeds to step S107.

When the correction-amount setting unit 222 determines that the captured image frame is not the first image frame (NO in step S105), the process directly proceeds to step S107. In this case, the correction-amount setting unit 222 sets the amount of correction that has been previously used (the amount of correction that has been calculated for the first image frame), which may be read out from the memory, as the amount of correction used for the captured image (frame).

In step S107, the zenith-rotation correction unit 220 of the spherical-image camera 110 applies the tilt correction on the captured image frame based on the current amount of correction for the tilt (the current tilt-correction amount). In the case of the interval-shot images, the corrected image frames may be stored as still images. In the case of the time-lapse moving image, the corrected image frames may be encoded together and stored as a moving image.

In step S108, the spherical-image camera 110 determines whether to continue the shooting. When the spherical-image camera 110 determines that the shooting is continued (YES in step S108), the process returns to step S104 to capture next image frame. When a preset number of images have been captured and the spherical-image camera 110 determines that the shooting is not needed to continue (NO in step S108), the spherical-image camera 110 ends the process.

FIG. 8 is a flowchart of the process of correcting a spherical image performed by the spherical-image camera 110 based on a shooting mode set during the viewing in an embodiment. As illustrated in FIG. 8, the spherical-image camera 110 starts the process in response to a request for viewing from a user, which may be received via the information processing terminal 150.

In step S201, the spherical-image camera 110 reads the spherical-image data 240. In the case of the interval-shot images, the spherical-image data 240 is designated as a set of still images. In the case of the time-lapse moving image, the spherical-image data 240 is designated as the moving image. In step S201, the mode setting unit 224 may acquire the shooting mode selected at the time of shooting, for example, from the metadata of the spherical-image data 240. Alternatively, the request for viewing may include the designation of the correction mode. In step S202, the mode setting unit 224 of the spherical-image camera 110 sets the fixed-correction mode or the follow-up correction mode based on the shooting mode selected at the time of shooting and the designated correction mode. When the fixed-correction mode is not set (NO in step S202), any desired process according to the selected shooting mode (for example, the usual correction process in which the amount of correction is dynamically set) is performed in step S209. Then, the spherical-image camera 110 ends the process.

When the fixed-correction mode is set (YES in step S202), the process proceeds to step S203. The spherical-image camera 110 starts correcting the tilt in step S203, and acquires an image frame in step S204. In step S205, the correction-amount setting unit 222 determines whether the image frame is the first image frame. When the correction-amount setting unit 222 determines that the image frame is the first image frame (YES in step S205), the process proceeds to step S206. In step S206, the correction-amount setting unit 222 of the spherical-image camera 110 sets the amount of correction for the tilt correction process based on a sensor-output value recorded in association with the image frame. Then, the process proceeds to step S207.

When the correction-amount setting unit 222 determines that the captured image frame is not the first image frame (NO in step S205), the process directly proceeds to step S207. In this case, the correction-amount setting unit 222 sets the amount of correction that has been previously used (the amount of correction that has been calculated for the first image frame) as the amount of correction used for the captured image frame, irrespective of the sensor-output value recorded in association with the image frame.

In step S207, the zenith-rotation correction unit 220 of the spherical-image camera 110 applies the tilt correction on the image frame based on the current amount of correction for the tilt (the current tilt-correction amount).

In step S208, the spherical-image camera 110 determines whether a subsequent frame exists. When the spherical-image camera 110 determines that a subsequent frame exists (YES in step S208), the process returns to step S204 to acquire next image frame. When the spherical-image camera 110 determines that a subsequent frame does not exist (NO in step S208), the spherical-image camera 110 ends the process.

FIG. 9 is a flowchart of the process of correcting a spherical image performed by the spherical-image camera 110 based on a sensor output during the shooting in an embodiment. As illustrated in FIG. 9, the spherical-image camera 110 starts the process in response to a request for shooting from a user, which may be received via the spherical-image camera 110.

The spherical-image camera 110 starts continuous shooting in step S301, and captures an image frame in step S302. In step S303, the correction-amount setting unit 222 determines whether the captured image frame is the first image frame. When the correction-amount setting unit 222 determines that the captured image frame is the first image frame (YES in step S303), the process proceeds to step S304. In step S304, the correction-amount setting unit 222 of the spherical-image camera 110 sets the amount of correction for the tilt correction process based on an output from the sensor 136. Then, the process proceeds to step S306.

When the correction-amount setting unit 222 determines that the captured image frame is not the first image frame (NO in step S303), the process proceeds to step S305. In step S305, the state determination unit 226 determines whether the viewpoint is presumed to be at a fixed state based on the output of the sensor 136. As the method of determining whether the viewpoint is at the fixed state, it is determined that the viewpoint is at the fixed state when a sensor output remains at a threshold value or less during the time period from the previous shooting to the current shooting using, for example, the sensor 136.

When the state determination unit 226 determines that the viewpoint is not at the fixed state (NO in step S305), the process proceeds to step S304. In this case, the angle of the spherical-image camera 110 might have been shifted. Accordingly, the correction-amount setting unit 222 of the spherical-image camera 110 recalculates and sets the amount of correction for the tilt correction process based on the output from the sensor 136. Then, the process proceeds to step S306. When the state determination unit 226 determines that the viewpoint is at the fixed state (YES in step S305), the process directly proceeds to step S306. In this case, the correction-amount setting unit 222 sets the amount of correction that has been previously used (the amount of correction that has been calculated for the first image frame or the amount of correction calculated when there was a change in the state) as the amount of correction used for the image frame.

In step S306, the zenith-rotation correction unit 220 of the spherical-image camera 110 applies the tilt correction on the captured image frame based on the current amount of correction for the tilt (the current tilt-correction amount).

In step S307, the spherical-image camera 110 determines whether to continue the shooting. When the spherical-image camera 110 determines that the shooting is continued (YES in step S307), the process returns to step S302 to capture next image frame. When the correction-amount setting unit 222 determines that the shooting is not needed to continue (NO in step S307), the process ends.

FIG. 9 is a flowchart of the process of correcting a spherical image performed by the spherical-image camera 110 based on a sensor output during the viewing in an embodiment. As illustrated in FIG. 10, the spherical-image camera 110 starts the process in response to a request for viewing from a user, which may be received via the information processing terminal 150.

In step S401, the spherical-image camera 110 reads the spherical-image data 240. The spherical-image camera 110 starts correcting the tilt in step S402, and acquires an image frame in step S403. In step S404, the correction-amount setting unit 222 determines whether the image frame is the first image frame. When the correction-amount setting unit 222 determines that the image frame is the first image frame (YES in step S404), the process proceeds to step S405. In step S405, the correction-amount setting unit 222 of the spherical-image camera 110 sets the amount of correction for the tilt correction process based on a sensor-output value recorded in association with the image frame. Then, the process proceeds to step S407.

When the correction-amount setting unit 222 determines that the image frame is not the first image frame (NO in step S404), the process proceeds to step S406. In step S406, the state determination unit 226 determines whether the viewpoint is presumed to be at a fixed state based on the output of the sensor 136. When the state determination unit 226 determines that the viewpoint is not at the fixed state (NO in step S406), the process proceeds to step S405. In step S405, the correction-amount setting unit 222 of the spherical-image camera 110 recalculates and sets the amount of correction for the tilt correction process based on the output from the sensor 136. Then, the process proceeds to step S407.

When the state determination unit 226 determines that the viewpoint is at the fixed state (YES in step S406), the process directly proceeds to step S407. In this case, the correction-amount setting unit 222 sets the amount of correction that has been previously used (the amount of correction that has been calculated for the first image frame or the amount of correction calculated when there was a change in the state) as the amount of correction used for the image frame.

In step S407, the zenith-rotation correction unit 220 of the spherical-image camera 110 applies the tilt correction on the image frame based on the current amount of correction for the tilt (the current tilt-correction amount).

In step S408, the spherical-image camera 110 determines whether a subsequent frame exists. When the spherical-image camera 110 determines that a subsequent frame exists (YES in step S408), the process returns to step S403 to acquire next image frame. When the spherical-image camera 110 determines that a subsequent frame does not exist (NO in step S408), the spherical-image camera 110 ends the process.

Figure 11:
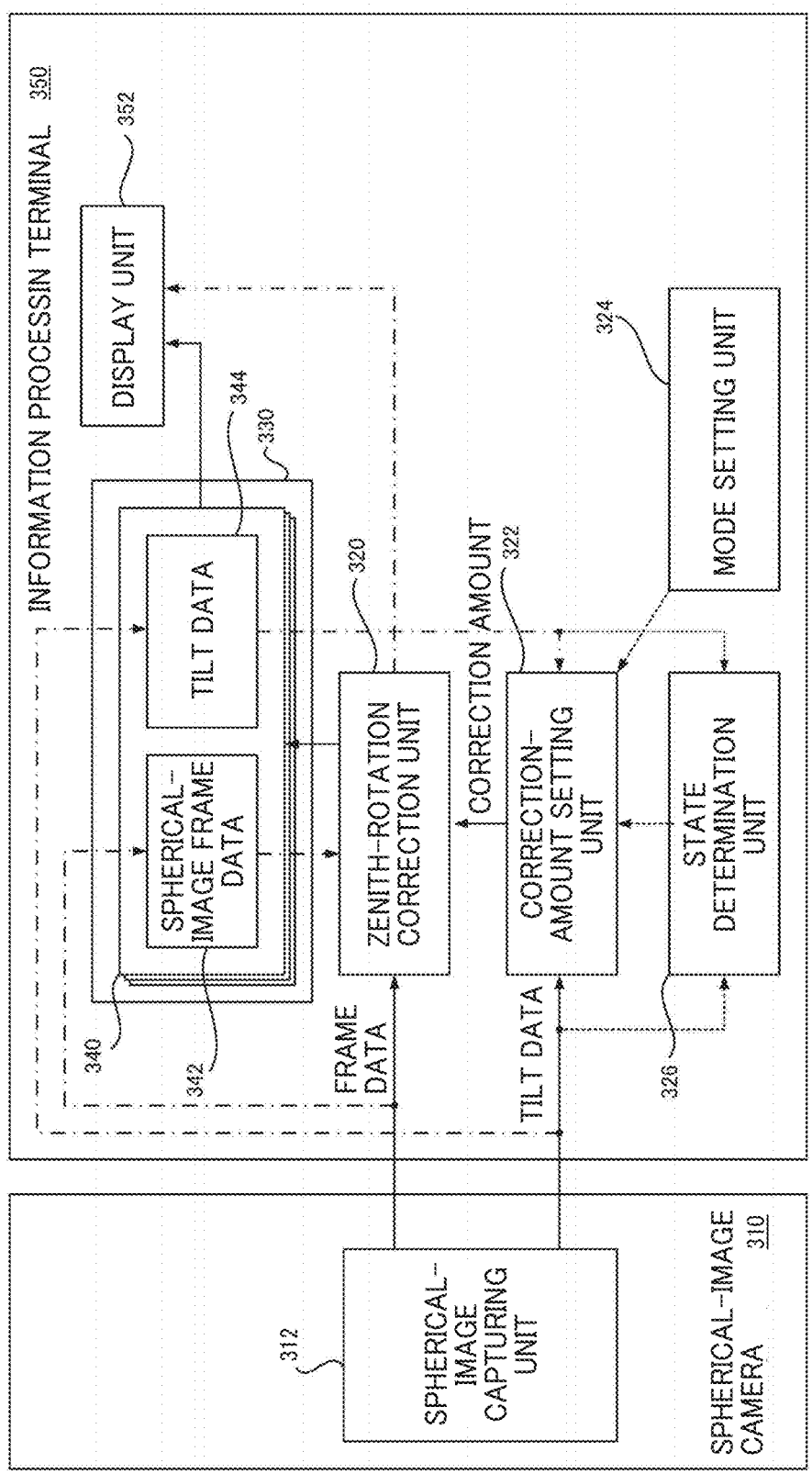
FIG. 11 is a block diagram of a functional configuration relevant to a spherical-image correcting capability implemented on a spherical-image processing system according to another embodiment.

Another embodiment is described with reference to FIG. 11. FIG. 11 is a functional block diagram related to a spherical-image correction function implemented on the spherical-image processing system according to another embodiment. According to the embodiment illustrated in FIG. 11, the tilt correction unit, the correction-amount setting unit, the state determination unit, and the mode setting unit are implemented by the information processing terminal 150 as the information processing apparatus connected to the spherical-image camera 110.

In the embodiment illustrated in FIG. 11, the spherical-image camera 110 includes a spherical-image capturing unit 312. The spherical-image capturing unit 312 outputs spherical-image frame data to the information processing terminal 150. In this case, the spherical-image capturing unit 312 outputs, as metadata, the tilt data measured using the sensor 136 during the image capturing. The spherical-image frame data and the tilt data may be temporarily stored in storage unit. In the embodiment illustrated in FIG. 1I, the spherical-image camera 110 has the function of outputting the captured frame data and measured tilt data to the information processing terminal 150.

The information processing terminal 150 is a terminal device in which an application for communicating with the spherical-image camera 110 to view and reproduce spherical images is installed as described for FIG. 3. In the embodiment in FIG. 11, the information processing terminal 150 includes the storage unit 330, the zenith-rotation correction unit 320, the correction-amount setting unit 322, the mode setting unit 324, the state determination unit 326, and the display unit 352, which are implemented on the application. In the information processing terminal 150, the spherical-image frame data and tilt data output from the spherical-image camera 110 are recorded in the storage unit 330 as the spherical-image data 340 after a correction to be described below (one or both of the zenith correction and the rotation correction) is applied or as is.

The storage unit 330 stores one or more spherical-image data 340 captured by and output from the spherical-image capturing unit 312 of the spherical-image camera 110. The storage unit 330 is a storage area of the removable memory 160, HDD 156, or a solid state drive (SSD). The spherical-image data 340 includes spherical-image frame data 342 and tilt data 344. The zenith-rotation correction unit 320, the correction-amount setting unit 322, the state determination unit 326, and the mode setting unit 324 are the same as those in the embodiment illustrated in FIG. 3. Accordingly, the description of these units are omitted.

The display unit 352 is used to view the spherical-image data. The display unit 352 displays a spherical image on a display device, such as the display 162 included in the information processing terminal 150, based on the spherical-image data corrected by the zenith-rotation correction unit 320, or the spherical-image data stored in the storage unit 330 after being corrected by the zenith-rotation correction unit 320.

The information processing terminal 150 receives various instructions from the operator via the application. For example, the information processing terminal 150 receives an instruction to correct a spherical image designated by the operator (for example, an instruction to display interval-shot images for viewing while performing the tilt correction). In the information processing terminal 150, in response to receiving various instructions from the operator, the instruction is output to the zenith-rotation correction unit 320. In response to the instruction, the zenith-rotation correction unit 320 performs the zenith correction and the rotation correction on the specified spherical-image data 340 designated by the operator, and then display corrected image data. The image display unit 352 outputs and displays the spherical image on which the zenith correction and the rotation correction have been performed by the zenith-rotation correction unit 320 onto the display of the information processing terminal 150.

In the embodiment illustrated in FIG. 11, the processes in FIGS. 7 to 10 are performed by the information processing terminal 150 except for the process of capturing an image. The process of capturing an image includes the processes in step S103 and step S104 (FIG. 7) and step S301 and step S302 (FIG. 9) of the spherical-image correcting process during the shooting.

Figure 12:
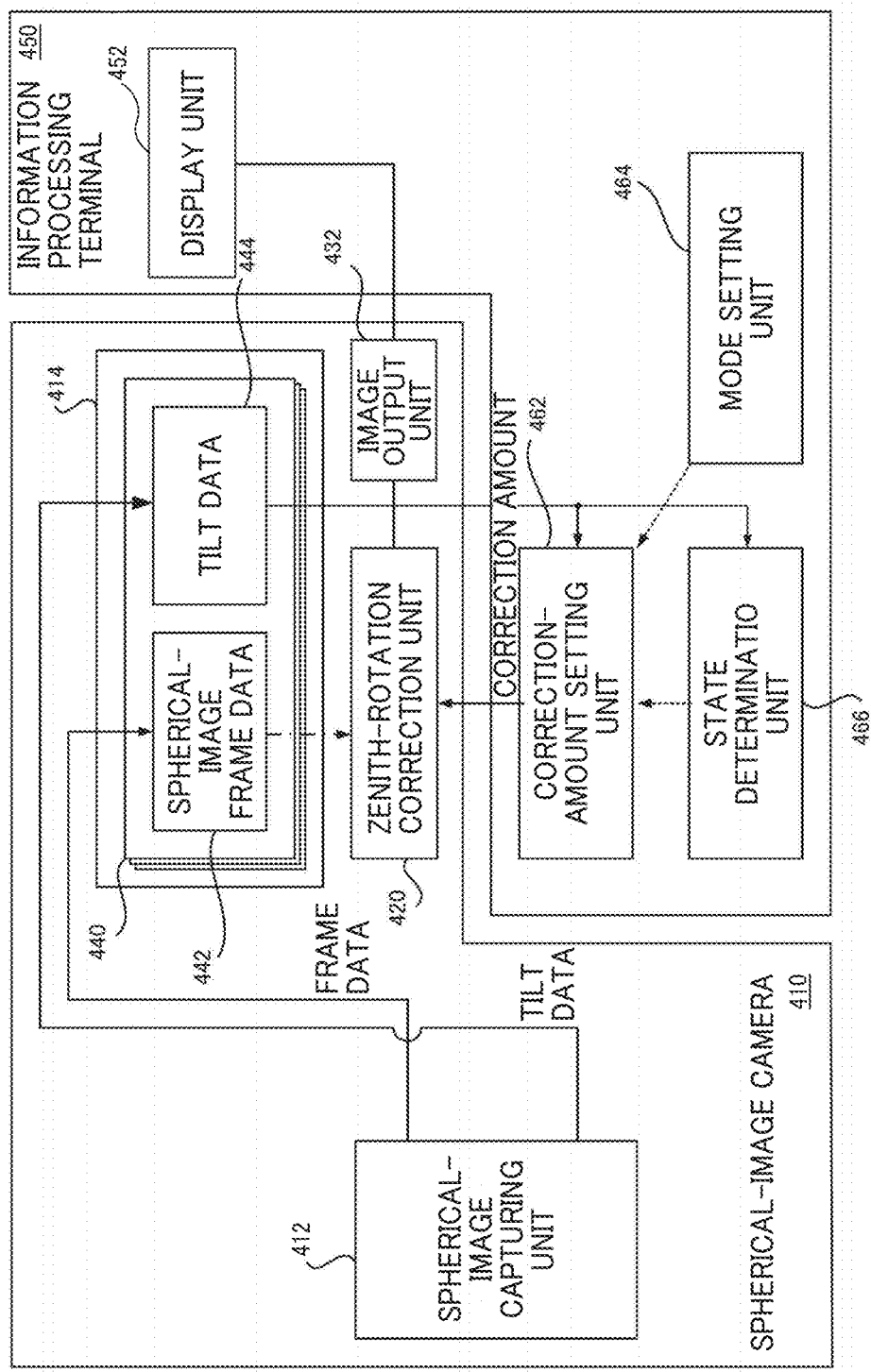
FIG. 12 is a block diagram of a functional configuration relevant to a spherical-image correcting capability implemented on a spherical-image processing system according to still another embodiment.

Still another embodiment is described with reference to FIG. 12. FIG. 12 is a functional block diagram related to a spherical-image correction function implemented on the spherical-image processing system according to still another embodiment. In the embodiment illustrated in FIG. 12, the correction-amount setting unit 222, the mode setting unit 224, and the state determination unit 226 are implemented on the information processing terminal 150, and the tilt correction is performed by the spherical-image camera 110 as the imaging device that is an external device of the information processing terminal 150.

In the embodiment illustrated in FIG. 12, the spherical-image camera 110 includes the spherical-image capturing unit 412, the storage unit 414, the zenith-rotation correction unit 420, and the image output unit 432. The spherical-image capturing unit 412 stores spherical-image frame data in the storage unit 414. In this case, the spherical-image capturing unit 412 stores, as metadata, the tilt data measured using the sensor 136 during the image capturing. The output spherical-image frame data and tilt data are recorded in the storage unit 414 as the spherical-image data 440 before the tilt correction (one or both of the zenith correction and the rotation correction) is applied. The spherical-image data 340 includes spherical-image frame data 342 and tilt data 344.

In the embodiment illustrated in FIG. 12, the information processing terminal 150 includes the correction-amount setting unit 462, the mode setting unit 464, the state determination unit 466, and the display unit 452.

The state determination unit 466 and the mode setting unit 464 are the same as those in the embodiment illustrated in FIG. 3. Accordingly, the description of these units are omitted. The correction-amount setting unit 462 sets a fixed value or a fixed amount of correction for the tilt correction (the tilt angle and the rotation angle) in cooperation with one or both of the mode setting unit 464 and the state determination unit 466, such that the fixed amount of correction is set for a plurality of frame images. Then, the the set amount of correction is output to the spherical-image camera 110.

The zenith-rotation correction unit 420 of the spherical-image camera 110 performs the tilt correction (correct one or both of the zenith correction and the rotation correction) on each frame image of the spherical-image frame data based on the amount of correction for the tilt correction (the tilt angle and the rotation angle) set by the correction-amount setting unit 462, which has been output from the information processing terminal 150. The image output unit 432 outputs the spherical image on which the zenith correction and the rotation correction have been performed by the zenith-rotation correction unit 420 to the information processing terminal 150 that is the request sender terminal.

The information processing terminal 150 receives various instructions from the operator via the application. For example, the information processing terminal 150 receives an instruction to correct a spherical image designated by the operator (for example, an instruction to display interval-shot images for viewing while performing the tilt correction). In response to accepting an instruction of the operator to correct a spherical image designated by the operator (for example, an instruction to display images captured by interval shot for viewing while correcting), the information processing terminal 150 issues, to the spherical-image camera 110, a request to output tilt data of the spherical image designated by the operator. The correction-amount setting unit 462 acquires from the spherical-image camera 110 the tilt data corresponding to the spherical image designated by the operator, and sets the amount of correction for the tilt correction. Then, the correction-amount setting unit 462 outputs the amount of correction to the spherical-image camera 110, and issues a request to output the corrected image data of the designated spherical image.

In response to receiving the request to correct the spherical image (for example, a request to output a spherical image corrected based on a predetermined amount of correction) from the information processing terminal 150, the request is sent to the zenith-rotation correction unit 420 in the spherical-image camera 110. In response to the request for correcting the spherical image, the zenith-rotation correction unit 420 performs the zenith correction and the rotation correction on a specified spherical-image data 440, and then generates data of a corrected image. The image output unit 432 outputs the spherical image on which the zenith correction and the rotation correction have been performed by the zenith-rotation correction unit 420 to the information processing terminal 150 that is the request sender terminal. The display unit 452 displays a spherical image on the display device such as the display 162 of the information processing terminal 150 based on the image data output from the spherical-image camera 110.

In the embodiment illustrated in FIG. 12, the processes in FIGS. 8 to 10 are performed by the information processing terminal 150 except for the process of correcting the tilt. The process of correcting the tilt includes the processes in step S207 and step S407 (FIGS. 8 and 10) of the spherical-image correcting process during the viewing.

In the embodiment illustrated in FIG. 12, the zenith correction and rotation correction processes, whose load is relatively large, are actually implemented on the spherical-image camera 110 side, and the information processing terminal 150 merely receives and displays the correction result. With this configuration, regardless of the processing performance of the information processing terminal 150, it is possible to stably reproduce moving images while performing the zenith correction and the rotation correction effectively and at high speed by using the typical module of the spherical-image camera 110.

The above-described embodiments provide a device, apparatus, method, and a storage medium storing program, each of which is capable of preventing the viewers of captured images from feeling uncomfortable due to slight changes in the output of the sensor when the tilt correction is performed on the images so as to improve the image quality.

Preferably, in continuous shooting such as interval shooting, a mode is provided in which the user fixes the amount of correction (sets a fixed amount of correction) for tilt correction, and when this mode is selected, any desired fixed tilt-correction value is used in common for all shot images in the tilt correction process. With this configuration, a high-quality image according to the user's desire can be provided. Alternatively, if it is determined based on the output of the sensor that the viewpoint (camera) is at the fixed state during the continuous shooting, any desired fixed value for the tilt correction is used to correct the tilt of all the captured images. As a result, a high-quality image according to the shooting condition is provided.

In the above-described embodiment, the cases where two partial images captured by the lens optical systems each having an angle of view greater than 180 degrees are superimposed and synthesized are described. However, no limitation is intended thereby. In some other embodiments, three or more partial images captured by one or more lens optical systems may be superimposed on each other and synthesized. Further, the configurations according to the above-described embodiments are applied to an imaging system equipped with fish-eye lenses. Alternatively, the configurations according to the embodiments of the present disclosure are applicable in a spherical moving-image imaging system equipped with super-wide-angle lenses. Further, the tilt correction is not limited to the zenith correction and the rotation correction for the spherical image, and typical tilt correction processes of other type of images may be performed. Further, in this disclosure, the spherical image does not have to be the full-view spherical image of a full 360 degrees in the horizontal direction. For example, the spherical image may be a wide-angle view image having an angle of anywhere from 180 to any amount less than 360 degrees in the horizontal direction.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), DSP (digital signal processor), FPGA (field programmable gate array) and conventional circuit components arranged to perform the recited functions.

For example, the functional units as described above is implemented by a computer-executable program written by legacy programming language or object-oriented programming language such as assembler language, C language, C++ language, C # language, and Java (registered trademark), and the program can be distributed via telecommunication line or upon being written on a computer-computer-readable recording medium such as ROM, electrically erasable and programmable read only memory (EEPROM), erasable programmable read only memory (EPROM), flash memory, flexible disk, compact disc read only memory (CD-ROM), compact disc rewritable (CD-RW), digital versatile disk (DVD)-ROM, DVD-RAM, DVD-RW, Blu-ray disc, secure digital (SD) card, and magneto-optical disc (MO). All or some of the functional units described above can be implemented, for example, on a programmable device such as a field programmable gate array (FPGA), or as an application specific integrated circuit (ASIC). To implement such functional units on the programmable device, circuit configuration data (bit stream data) to be downloaded to the programmable device can be distributed using a recording medium that stores data written in, for example, a hardware description language (HDL). Very High Speed Integrated Circuit Hardware Description Language (VHDL), or Verilog HDL.

Numerous additional modifications and variations are possible in light of the above teachings. It is therefore to be understood that, within the scope of the appended claims, the disclosure of this patent specification may be practiced otherwise than as specifically described herein. For example, elements and/or features of different illustrative embodiments may be combined with each other and/or substituted for each other within the scope of this disclosure and appended claims.

What is claimed is:

1. An imaging device comprising:
an imaging optical system configured to capture a plurality of images of an object;
a sensor configured to detect a tilt of the imaging device with respect to a reference direction; and
processing circuitry configured to:
set a fixed amount of correction to be commonly applied to the plurality of images, based on the detected tilt; and
correct the tilt of each of the plurality of images using the fixed amount of correction,
wherein the processing circuitry sets a fixed-correction mode which corrects the tilt based on a selection made by a user so that an amount of correction of the tilt that is fixed is a same value, and
wherein the processing circuitry sets the fixed-correction mode, even when the imaging device is moving, when the selection made by the user indicates to set the fixed-correction mode.

2. The imaging device according to claim 1, wherein:
the fixed amount of correction is set according to setting of the fixed-correction mode.

3. The imaging device according to claim 2,
wherein the plurality of images is continuously captured,
wherein the processing circuitry sets the fixed-correction mode, when the selected shooting mode is a shooting mode in which a viewpoint is made stationary, and
wherein the processing circuitry sets a follow-up correction mode in which an amount of correction is dynamically set based on the detected tilt, when the selected shooting mode is a shooting mode in which the viewpoint is presumed to be shifted.

4. The imaging device according to claim 1,
wherein the plurality of images is continuously captured, and
the processing circuitry is further configured to determine whether a viewpoint is at a fixed state during a shooting of the plurality of images, based on a change in the tilt between the plurality of images, and to set the fixed amount of correction to be commonly applied to the plurality of images based on a determination that the viewpoint is at the fixed state during the shooting.

5. The imaging device according to claim 1,
wherein the plurality of images is continuously captured, and the processing circuitry determines the fixed amount of correction based on at least one tilt value detected by the sensor at a time of capturing at least one of a first image, a last image, and an intermediate image captured between the first image and the last image, among the plurality of images.

6. The imaging device according to claim 1,
wherein the processing circuitry is configured to correct the tilt of each of the plurality of images, before viewing of the plurality of images.

7. The imaging device according to claim 1,
wherein the processing circuitry is configured to store the plurality of images in a memory, and
in response to a request for viewing the plurality of images, correct the tilt of each of the plurality of images read out from the memory.

8. The imaging device according to claim 1,
wherein the imaging optical system captures, as the plurality of images, a plurality of spherical images,
the tilt detected by the sensor includes at least one of a tilt angle relative to the reference direction and a rotation angle around the reference direction, and
the processing circuitry corrects, in the correction of the tilt, at least one of:
zenith of each of the plurality of images based on the tilt angle; and
rotation of each of the plurality of images based on the rotation angle.

9. A system comprising:
the imaging device of claim 1; and
an information processing apparatus communicably connected with the imaging device, comprising another circuitry configured to:
obtain the plurality of images of the object, each having the tilt corrected, from the imaging device, in response to a request for viewing of the plurality of images; and
control a display to display the obtained plurality of images.

10. An information processing apparatus comprising:
processing circuitry configured to:
acquire a plurality of images of an object, each captured by an imaging device, and tilt data indicating a tilt of the imaging device with respect to a reference direction;
set a fixed amount of correction to be commonly applied to the plurality of images, based on the detected tilt;
correct the tilt of each of the plurality of images using the fixed amount of correction; and
control a display to display the plurality of images of the object, each having the tilt corrected, in response to a request for viewing of the plurality of images,
wherein the processing circuitry sets a fixed-correction mode which corrects the tilt based on a selection made by a user so that an amount of correction of the tilt that is fixed is a same value, and
wherein the processing circuitry sets the fixed-correction mode, even when the imaging device is moving, when the selection made by the user indicates to set the fixed-correction mode.

11. The information processing apparatus according to claim 10, wherein:
the fixed amount of correction is set according to setting of the fixed-correction mode.

12. The information processing apparatus according to claim 10,
wherein the plurality of images is continuously captured, and the processing circuitry is further configured to determine whether a viewpoint is at a fixed state during a shooting of the plurality of images, based on a change in the tilt between the plurality of images, and to set the fixed amount of correction to be commonly applied to the plurality of images based on a determination that the viewpoint is at the fixed state during the shooting.

13. A system comprising:
the information processing apparatus of claim 10; and
an imaging device communicably connected with the information processing apparatus, comprising:
an imaging optical system configured to capture a plurality of images of an object;
a sensor configured to detect a tilt of the imaging device with respect to a reference direction; and
another processing circuitry configured to transmit the plurality of images of the object, and tilt data indicating the tilt of the imaging device for each of the plurality of images, to the information processing apparatus.

14. A system comprising:
an imaging device including:
an imaging optical system configured to capture a plurality of images of an object; and
a sensor configured to detect a tilt of the imaging device with respect to a reference direction;
an information processing apparatus including:
processing circuitry configured to acquire the plurality of images, and tilt data indicating the detected tilt, and set a fixed amount of correction to be commonly applied to the plurality of images based on the detected tilt,
wherein the imaging device further includes another processing circuitry configured to correct the tilt of each of the plurality of images using the fixed amount of correction based on a selection made by a user so that an amount of correction that is fixed is a same value, and
wherein the another processing circuitry corrects the tilt of each of the plurality of images using the fixed amount of correction, even when the imaging device is moving, when the selection made by the user indicates to use the fixed amount of correction.

15. An information processing method, comprising:
acquiring a plurality of images of an object, each captured by an imaging device;
obtaining information on an output of a sensor indicating a tilt of the imaging device with respect to a reference direction;
setting a fixed amount of correction to be commonly applied to the plurality of images, based on the detected tilt, so that an amount of correction that is fixed is a same value; and
correcting the tilt of each of the plurality of images using the fixed amount of correction based on a selection made by a user, even when the imaging device is moving, when the selection made by the user indicates to use the fixed amount of correction.

16. The information processing method of claim 15, further comprising:
displaying, on a display, the plurality of images of the object, each having the tilt corrected, in response to a request for viewing of the plurality of images.

17. A non-transitory recording medium storing a plurality of instructions which, when executed by one or more processors, cause the processors to perform an information processing method comprising:

acquiring a plurality of images of an object, each captured by an imaging device;

obtaining information on an output of a sensor indicating a tilt of the imaging device with respect to a reference direction;

setting a fixed amount of correction to be commonly applied to the plurality of images, based on the detected tilt so that an amount of correction that is fixed is a same value; and correcting the tilt of each of the plurality of images using the fixed amount of correction based on a selection made by a user, even when the imaging device is moving, when the selection made by the user indicates to use the fixed amount of correction.

18. The recording medium of claim 17, wherein the information processing method further comprises:

displaying, on a display, the plurality of images of the object, each having the tilt corrected, in response to a request for viewing of the plurality of images.

* * * * *